United States Patent
Humayun et al.

(10) Patent No.: US 11,559,885 B2
(45) Date of Patent: Jan. 24, 2023

(54) METHOD AND SYSTEM FOR GRASPING AN OBJECT

(71) Applicant: Intrinsic Innovation LLC, Mountain View, CA (US)

(72) Inventors: Ahmad Humayun, Union City, CA (US); Michael Stark, Union City, CA (US); Nan Rong, Union City, CA (US); Bhaskara Mannar Marthi, Union City, CA (US); Aravind Sivakumar, Union City, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 0 days.

(21) Appl. No.: 17/375,798

(22) Filed: Jul. 14, 2021

(65) Prior Publication Data

US 2022/0016766 A1  Jan. 20, 2022

Related U.S. Application Data

(60) Provisional application No. 63/164,078, filed on Mar. 22, 2021, provisional application No. 63/162,360, (Continued)

(51) Int. Cl.
*G05B 15/00* (2006.01)
*G05B 19/00* (2006.01)
(Continued)

(52) U.S. Cl.
CPC ............ *B25J 9/1612* (2013.01); *B25J 9/161* (2013.01); *B25J 9/1664* (2013.01); *B25J 19/023* (2013.01);
(Continued)

(58) Field of Classification Search
CPC ........ B25J 9/1612; B25J 9/161; B25J 9/1664; B25J 19/023; G06N 3/08; G06T 7/50;
(Continued)

(56) References Cited

U.S. PATENT DOCUMENTS 8,837,839 B1   9/2014  Huber et al.
9,659,408 B2   5/2017  Robert et al.
(Continued)

FOREIGN PATENT DOCUMENTS

EP    3405910 B1    11/2020
WO   2019097004 A1   5/2019

OTHER PUBLICATIONS

Buls, Elvijs , et al., "Generation of Synthetic Training Data for Object Detection in Piles", Eleventh International Conference on Machine Vision (ICMV 2018), Proc. of SPIE vol. 11041 2019.
(Continued)

*Primary Examiner* — Harry Y Oh
(74) *Attorney, Agent, or Firm* — Fish & Richardson P.C.

(57) ABSTRACT

The method for increasing the accuracy of grasping an object can include: labelling an image based on an attempted object grasp by a robot and generating a trained graspability network using the labelled images. The method can additionally or alternatively include determining a grasp point using the trained graspability network; executing an object grasp at the grasp point S400; and/or any other suitable elements.

21 Claims, 14 Drawing Sheets

Related U.S. Application Data filed on Mar. 17, 2021, provisional application No. 63/051,844, filed on Jul. 14, 2020.

(51) Int. Cl.
*B25J 9/16* (2006.01)
*B25J 19/02* (2006.01)
*G06N 3/08* (2006.01)
*G06T 7/50* (2017.01)

(52) U.S. Cl.
CPC .............. *G06N 3/08* (2013.01); *G06T 7/50* (2017.01); *G06T 2207/10028* (2013.01); *G06T 2207/20081* (2013.01); *G06T 2207/20084* (2013.01)

(58) Field of Classification Search
CPC . G06T 2207/10028; G06T 2207/20081; G06T 2207/20084
See application file for complete search history.

(56) References Cited

U.S. PATENT DOCUMENTS

| | | | |
|---|---|---|---|
| 10,824,923 | B1 | 11/2020 | Forster |
| 10,906,188 | B1* | 2/2021 | Sun ................ B25J 9/0093 |
| 10,950,043 | B1 | 3/2021 | Hillesland et al. |
| 11,275,942 | B2 | 3/2022 | Eyjolfsdottir et al. |
| 11,315,006 | B2 | 4/2022 | George et al. |
| 2013/0202213 | A1 | 8/2013 | Adamek et al. |
| 2016/0101519 | A1 | 4/2016 | Kopicki |
| 2017/0236037 | A1 | 8/2017 | Rhoads et al. |
| 2018/0082179 | A1 | 3/2018 | Gredilla et al. |
| 2018/0273297 | A1 | 9/2018 | Wagner et al. |
| 2019/0147221 | A1 | 5/2019 | Grabner et al. |
| 2019/0205732 | A1 | 7/2019 | Dileep et al. |
| 2019/0248003 | A1* | 8/2019 | Nagarajan .......... B25J 9/1697 |
| 2019/0283249 | A1 | 9/2019 | Komoda et al. |
| 2020/0061811 | A1 | 2/2020 | Iqbal et al. |
| 2020/0094405 | A1* | 3/2020 | Davidson ............ B25J 9/161 |
| 2020/0098162 | A1 | 3/2020 | Yago Vicente et al. |
| 2020/0147798 | A1 | 5/2020 | Toris et al. |
| 2020/0164505 | A1 | 5/2020 | Boer et al. |
| 2020/0316782 | A1 | 10/2020 | Chavez et al. |
| 2020/0331709 | A1 | 10/2020 | Huang et al. |
| 2020/0349764 | A1 | 11/2020 | Cappello et al. |
| 2020/0361083 | A1 | 11/2020 | Mousavian et al. |
| 2020/0368616 | A1 | 11/2020 | Delamont |
| 2021/0023720 | A1 | 1/2021 | Du et al. |
| 2021/0122586 | A1 | 4/2021 | Sun et al. |
| 2021/0125052 | A1 | 4/2021 | Tremblay et al. |
| 2022/0016765 | A1 | 1/2022 | Ku et al. |

OTHER PUBLICATIONS

Goldman, Dan B., et al., "Shape and Spatially-Varying BRDFs From Photometric Stereo", IEEE Transactions on Pattern Analysis and Machine Intelligence, vol. 32, No. 6, pp. 1060-1071, Jun. 2010, doi: 10.1109/TPAMI.2009.102.

Hughes, David M., "Enhancing Object Detection Models Via Synthetic Datasets", A Thesis Presented to the Faculty of California State Polytechnic University, Pomona, 2020.

Jaiswal, Ayush, et al., "Keypoints-aware Object Detection", Pre-registration workshop NeurIPS (2020), Vancouver, Canada.

Krainin, Michael, et al., "Manipulator and Object Tracking for In-Hand 3D Object Modeling", Sage Journals, vol. 30, Issue 11, 2011, Research Article, Jul. 7, 2011.

Lawrence, Jason, et al., "Inverse Shade Trees for Non-Parametric Material Representation and Editing", ACM Transactions on Graphics (Proc. SIGGRAPH), Jul. 2006.

Li, Tong, et al., "Keypoint-Based Robotic Grasp Detection Scheme in Multi-Object Scenes", Sensors, 2021, 21, 2132, https://mdpi.com/journal/sensors, Mar. 18, 2021.

Ma, Xiaojian, et al., "PointNetGPD: Detecting Grasp Configurations from Point Sets", arXiv:1809.06267, Sep. 17, 2018.

Wong, Matthew Z., et al., "Synthetic dataset generation for object-to-model deep learning in industrial applications", PeerJ Computer Science, Oct. 14, 2019.

Zeng, Andy, et al., "TossingBot: Learning to Throw Arbitrary Objects with Residual Physics", IEEE Transaction on Robotics, arXiv:1903.11239v3, May 30, 2020.

Moreno, Pol, et al., "Overcoming Occlusion with Inverse Graphics", Springer International Publishing Switzerland 2016.

Morrison, Douglas, et al., "Closing the Loop for Robotic Grasping: A Rea-time, Generative Grasp Synthesis Approach", arXiv:1804.05172v2 [cs.RO] May 15, 2018.

Zapata-Impata, Brayan, et al., "Fast geometry-based computation of grasping points on three-dimensional point clouds", International Journal of Advanced Robotic Systems, Apr. 2, 2019.

International Search Report and Written Opinion in International Appln. No. PCT/US2021/041560, dated Oct. 21, 2021, 12 pages.

* cited by examiner

METHOD AND SYSTEM FOR GRASPING AN OBJECT

CROSS REFERENCE TO RELATED APPLICATIONS

This application claims the benefit of each of U.S. Provisional Application No. 63/164,078, filed 22 Mar. 2021, U.S. Provisional Application No. 63/162,360, filed 17 Mar. 2021, and U.S. Provisional Application No. 63/051,844, filed 14 Jul. 2020, each of which is incorporated herein in its entirety by this reference.

TECHNICAL FIELD

This invention relates generally to the computer vision field, and more specifically to a new and useful method for grasping an object.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
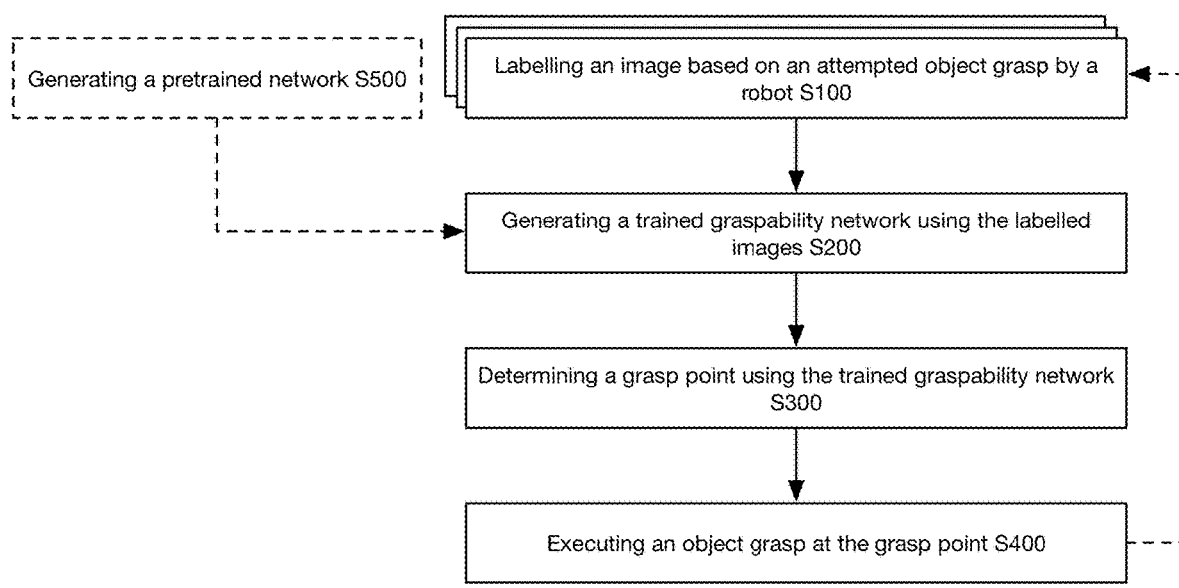
FIG. 1 is a diagrammatic representation of a variant of the method.

As shown in FIG. 1, the method for increasing the accuracy of grasping an object preferably includes labelling an image based on an attempted object grasp by a robot S100; generating a trained graspability network using the labelled images S200; determining a grasp point using the trained graspability network S300; executing an object grasp at the grasp point S400; and/or any other suitable elements.

Variants of the method and system can be used to select more accurate and successful object grasps (e.g., for packing robots, manufacturing robots, etc.); be used as a tiebreaker (or weighting tool) for other grasp selection methods; be used as a teacher for subsequent network training (e.g., the object detectors can be (re)trained using the trained network's output).

The term "grasp point" as used herein can refer to a physical point in space (e.g., within the scene), a virtual point corresponding to the physical point, a 3D point in space, a 2D image feature in an image, a point (e.g., voxel or set thereof) in a depth image (e.g., 2.5D), and/or any other suitable grasp point. Likewise, a "grasp point" can be defined in and/or referenced relative to joint/cartesian coordinate frame (e.g., spatial domain) or a sensor coordinate frame (e.g., image coordinate frame, pixel position; a planar projection of spatial domain, etc.). It is understood that conversion between sensor coordinate frames and spatial coordinate frames is known and understood in the field of endeavor, and thus they may be considered interchangeable as may be convenient.

2. Benefits

The method can confer several benefits over conventional systems.

First, variants of the technology can enable a more accurate grasping system. The object detectors can be trained using synthetic data (and/or annotated real-world data) and subsequently used to guide real-world training data generation. Since the generated training data is from a real-world scene, the graspability network can be trained and tested on data from the same distribution, which can improve the accuracy of the grasping system.

Second, variants of the technology can facilitate rapid target selection from a dense object scene (e.g., including numerous occluded objects) without requiring explicit detection of different object instances in the scene. In an example, the graspability network can rapidly generate graspability scores for pixels and/or a graspability map 108 for an image of the scene, wherein the grasp(s) can be selected based on the graspability scores. In some variants, auxiliary scene information can also be generated in parallel (e.g., the object detector can be run on the image to extract object poses), wherein the grasps can be further selected based on the auxiliary data (e.g., the grasps identified from the heatmap can be prioritized based on the corresponding object poses).

Third, variants of the technology can leverage the runtime efficiency of deep learning algorithms to reduce the runtime complexity of grasp selection (e.g., reduce computation time; target selection performed locally at a computing system with limited processing bandwidth) and/or increase the accuracy of target selection (e.g., >95% success rate, etc.).

Fourth, variants of the technology train a graspability network with limited real-world training data, minimizing the required training time on a particular machine and/or with a particular type of object. For example, the graspability network can be trained from a pretrained network (e.g., a depth enhancement network), trained using a diverse dataset (e.g., including high-confidence candidate grasp points, low-confidence candidate grasp points, estimated and actual grasp successes, estimated and actual grasp failures, etc.), trained using reinforcement learning, trained in epochs (e.g., wherein the method periodically explores low-confidence grasps or verifies the graspability of a grasp point), or otherwise trained.

However, the method and system can confer any other suitable benefits.

3. System

Figure 2A:
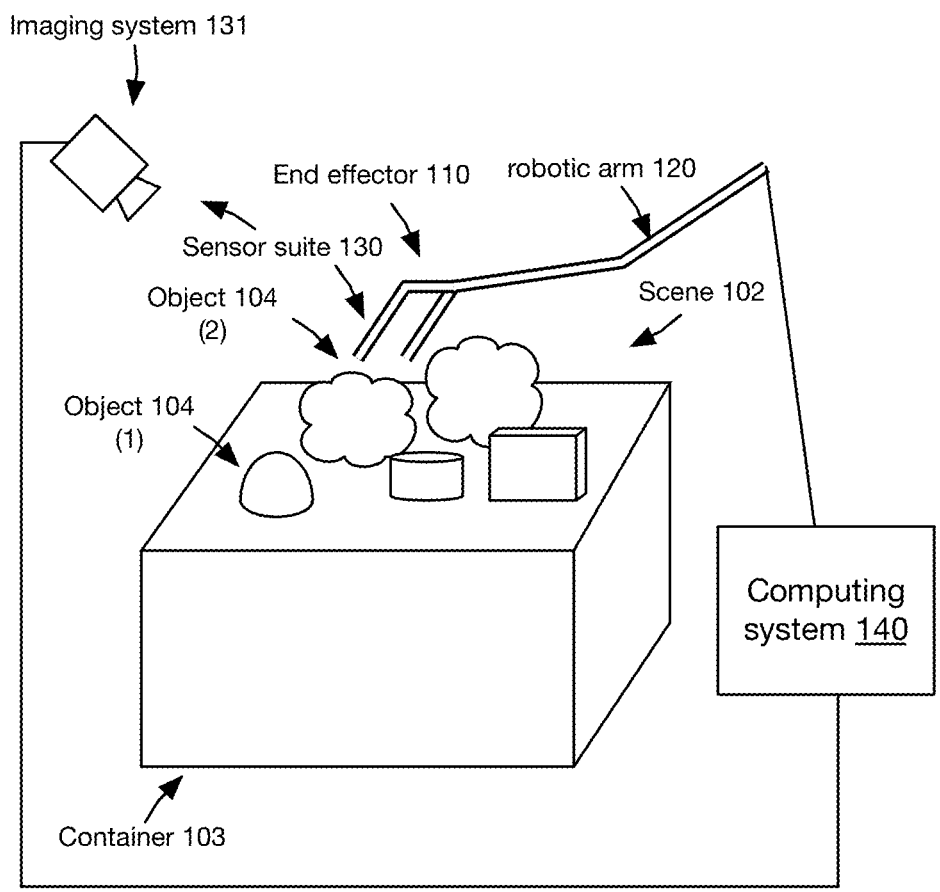
FIG. 2A is a schematic representation of a variant of the system.
Figure 2B:
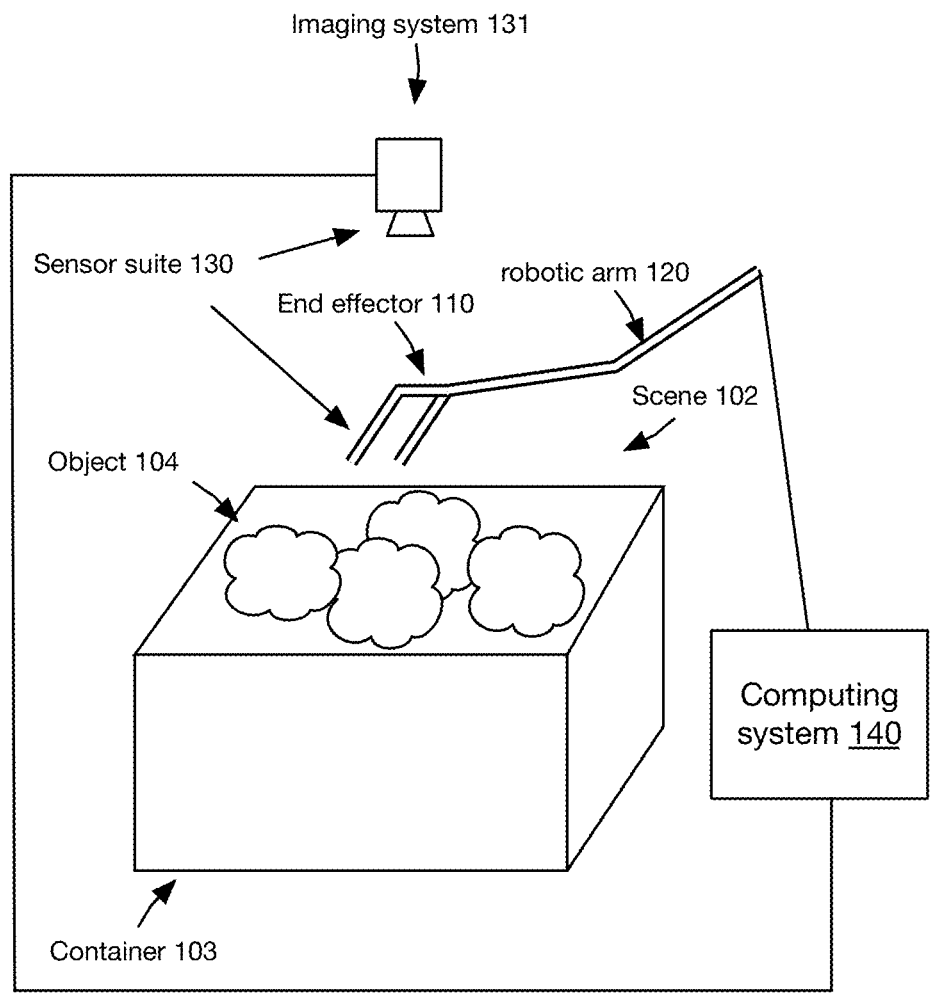
FIG. 2B is a schematic representation of a variant of the system.

The method is preferably performed using the system, examples of which are shown in FIGS. 2A and 2B, including: an end effector 110, a robotic arm 120, a sensor suite 130, a computing system 140, and/or any other suitable components. The system functions to enable selection of a grasp point 105 and/or articulate the robotic arm to grasp a target object associated with the grasp point 105.

The end effector preferably functions to grip an object. The end effector can be impactive, ingressive, astrictive, contigutive, and/or any other suitable type of end effector. In a first example, the end effector is a suction gripper. In a second example, the end effector is a claw gripper (e.g., dual prong, tri-prong, etc.). The end effector can be actuated: electrically (e.g., servo/motor actuation), pneumatically, hydraulically, unactuated (e.g., passive deformation based on motion of robotic arm, rigid body, etc.), and/or otherwise actuated. However, the system can include any other suitable end effector. The end effector is preferably mounted to the robotic arm, but can additionally or alternatively be mounted to and/or transformed by any suitable actuation mechanism (s) (e.g., CNC gantry system, etc.) and/or in any suitable actuation axes (e.g., 6-axis robotic actuation). However, the end effector can be otherwise configured.

The robotic arm preferably functions to position and/or articulate the end effector for grasping an object, but can additionally or alternatively provide any other suitable functionality. The robotic arm can be articulated by automatic control and/or can be configured to automatically execute control instructions 112 (e.g., control instructions determined based on the grasp point, dynamically determined control, etc.), however the system can alternatively be otherwise suitably controlled and/or otherwise suitably enable end effector articulation. The robotic arm can include any suitable number of joints which enable articulation of the end effector in a single degree of freedom (DOF). The arm preferably includes 6 joints (e.g., a 6-axis robotic arm), but can additionally or alternatively include seven joints, more than seven joints, and/or any other suitable number of joints.

The sensor suite 130 can include imaging systems 131, actuation feedback systems, and/or any other suitable sensors. Actuation feedback sensors of the actuation feedback system preferably function to enable control of the robotic arm (and/or joints therein) and/or the end effector, but can additionally or alternatively be used to determine the outcome (e.g., success or failure) of a grasp attempt. Actuator feedback sensors can include one or more of a: force-torque sensor, gripper state sensor (e.g., to determine the state of the gripper, such as open, closed, etc.), pressure sensor, strain gage, load cell, inertial sensor, positional sensors, displacement sensors, encoders (e.g., absolute, incremental), resolver, Hall-effect sensor, electromagnetic induction sensor, proximity sensor, contact sensor, and/or any other suitable sensors. However, the sensors can be otherwise configured. The sensor suite can include an imaging system which preferably functions to capture images of the inference scene, but can provide any other functionality. An imaging system can include: stereo camera pairs, CCD cameras, CMOS cameras, time-of-flight sensors (e.g., Lidar scanner, etc.), a range imaging sensors (e.g., stereo triangulation, sheet of light triangulation, structured light scanner, time-of-flight, interferometry, etc.), and/or any other suitable sensor. The sensors can be arranged into sensor sets and/or not arranged in sets. The imaging systems can determine one or more RGB images, depth images (e.g., pixel aligned with the RGB, wherein the RGB image and the depth image can be captured by the same or different sensor sets). Imaging sensors are preferably calibrated within a common coordinate frame (i.e., sensor coordinate frame) in a fixed/predetermined arrangement relative to a joint coordinate frame of the robotic arm, but can be otherwise suitably configured. Sensors of the sensor suite can be integrated into the end effector, the robotic arm, and/or any other component of the system, or can be otherwise mounted to a superstructure (e.g., above a picking bin/container, camera directed toward a picking bin, etc.), mounted to the robotic arm, mounted to the end-effector, and/or otherwise suitably arranged. However, the sensor suite can be otherwise configured.

The computing system can include and/or can be used with: an object detector 142, a graspability network 144, and/or any other suitable elements. The computing system can optionally include one or more of: a depth enhancement network 152, a grasp selector 146, a motion planner 148, and/or any other suitable elements. The computing system preferably functions to perform one or more steps of the method, optionally select a feature or object point for grasping (e.g., randomly, etc.), but can additionally or alternatively provide any other suitable functionality. The computing system can be local to the robotic arm, remote, and/or otherwise located. The computing system can include a control system, which can control the robotic arm, end effector, imaging systems, and/or any other system component. The control system can be wirelessly connected, electrically connected, and/or otherwise connected to one or more components of the system. However, the computing system can be otherwise configured.

The object detector functions to detect objects and/or other information in images. For example, the object detector can determine: individual instances of one or more object types, object parameters for each object (e.g., pose, principal axis, occlusion, etc.), total object count, and/or other object information. The object detector output is preferably used by a downstream grasp selector (e.g., different from or the same as grasp selector 146; etc.) to select a feature or object point for grasping; alternatively, the object detector can select the feature or object to grasp.

The object detector can be a neural network (e.g., CNN, fully connected, etc.), a graphical model (e.g., RCN, Bayesian network, etc.), a logistic regression, a clustering algorithm, an ORB feature detector, and/or any other suitable feature detector. The object detector can be a generative model, a discriminative model, and/or any other suitable object detector. In specific examples, the object detector can leverage one or more of: the architectures disclosed in U.S. application Ser. No. 15/461,748 filed 17 Mar. 2017, U.S. application Ser. No. 16/298,932 filed 11 Mar. 2019, and/or U.S. application Ser. No. 15/708,383 filed 19 Sep. 2017, each of which are incorporated in their entireties by this reference; RCN; CNNs (e.g., YOLO, R-CNN, R-FCN, etc.); histogram of gradients (HOG); single shot detectors (SSD); spatial pyramid pooling (SPP-net); and/or other models.

The object detector is preferably trained on synthetic images (e.g., trained using a set of artificially-generated object scenes), but can alternatively be trained on images of real scenes and/or other images. The synthetic images can be generated using the method disclosed in U.S. application Ser. No. 17/375,331 titled "METHOD AND SYSTEM FOR GENERATING TRAINING DATA" filed 14 Jul. 2021 incorporated herein in its entirety by this reference, generated using another method, retrieved from a database, or otherwise generated.

The input to the object detector is preferably a 2D image, but can additionally or alternatively include a depth map, point cloud, or any other suitable input. The output of the detector can include one or more features, keypoints (e.g., surface keypoints, unique object features, object bounding box features, etc.), labels (e.g., face labels, silhouette labels, texture labels, haptic labels), one or more object masks, one or more scores (e.g., a visibility score for each object, for each feature, etc.), and/or any other suitable information.

However, the object detector can be otherwise configured.

The computing system can include a graspability network 144 which functions to determine a grasp score (e.g., prediction of grasp success probability) for points and/or regions of an image. The graspability network can additionally or alternatively function as a tiebreaker for other grasp selection methods and/or can be used as a teacher for subsequent network training (e.g., the object detectors can be (re)trained using the trained network's output). In one example, the graspability network 144 functions to generate a graspability map (e.g., grasp score mask, a heatmap) for an object scene.

The graspability network can be a neural network (e.g., CNN, fully connected, etc.), such as a convolutional neural network (CNN), fully convolutional neural network (FCN), artificial neural network (ANN), a feed forward network, a clustering algorithm, and/or any other suitable neural network or ML model. The graspability network can include an encoder (e.g., VGG-16, ResNet, etc.), a decoder (e.g., CCN decoder, FCN decoder, RNN-based decoder, etc.), and/or any other suitable components. The graspability network can be a shallow network (e.g., VGG-16, ResNet 18, ResNet-34, etc.), a deep network (e.g., ResNet-50, ResNet-101, ResNet-152, etc.), and/or have any other suitable number of layers.

The computing system can optionally include a depth enhancement network 152 which functions to generate a refined depth map from an image (e.g., such as a RGB image and/or input depth image). The refined depth map can have less noise than the image, be more accurate or precise than the image, be denser than the image, and/or be otherwise related to the input image. The depth enhancement network can be a neural network (e.g., the same or different from the ones used for the object detector and/or graspability network) and/or another model. In a first variation, the depth enhancement network 152 is used as the basis for the graspability network 144. In a second variation, the depth enhancement network 152 is used to refine the measured depth of the scene (e.g., increase the accuracy in the depth measurements). However, the depth enhancement network 152 can be otherwise used.

The computing system can optionally include a grasp selector 146 which functions to select one or more grasp points within the scene. The grasp selector 146 is preferably configured to select grasp points from the output of the graspability network, but can additionally or alternatively be configured to select grasp points from the output of the object detector (e.g., an object detector can pre-process inputs to the grasp selector). In a first variation, the computing system includes a first grasp selector 146 for the graspability network and a second grasp selector for the object detector. In this variation, the first grasp selector 146 can select the grasp based on the grasp score for each image feature, the object pose for the object associated with (e.g., depicted by) the respective image feature (e.g., output by the object detector; output by the graspability network, example shown in FIG. 8), the confidence score for the image feature, and/or other information (examples shown in FIG. 6 and FIG. 7). The second grasp selector can select a grasp from the detected object instances based on a set of heuristics, rules, and/or other parameters. In variants, the second grasp selector can be the grasp selector as described in U.S. application Ser. No. 17/375,424 titled "METHOD AND SYSTEM FOR OBJECT GRASPING" filed 14 Jul. 2021 incorporated herein in its entirety by this reference. However, the first and second grasp selectors can be otherwise configured. In a second variation, the computing system includes a single grasp selector for both the graspability network and the object detector(s). In a third variation, the computing system includes a first candidate grasp point selector that selects candidate grasp points from the output of the graspability network (e.g., the first grasp selector 146 from the first variant), a second candidate grasp point selector that selects candidate grasp points from the output of the object detector (e.g., the second grasp selector 146 from the first variant), and a third grasp selector that selects a grasp point from the candidate grasp points output by the first and second grasp candidate selectors (e.g., based on heuristics, rules, a calculation, etc.). However, the grasp selector can be otherwise configured.

Figure 6:
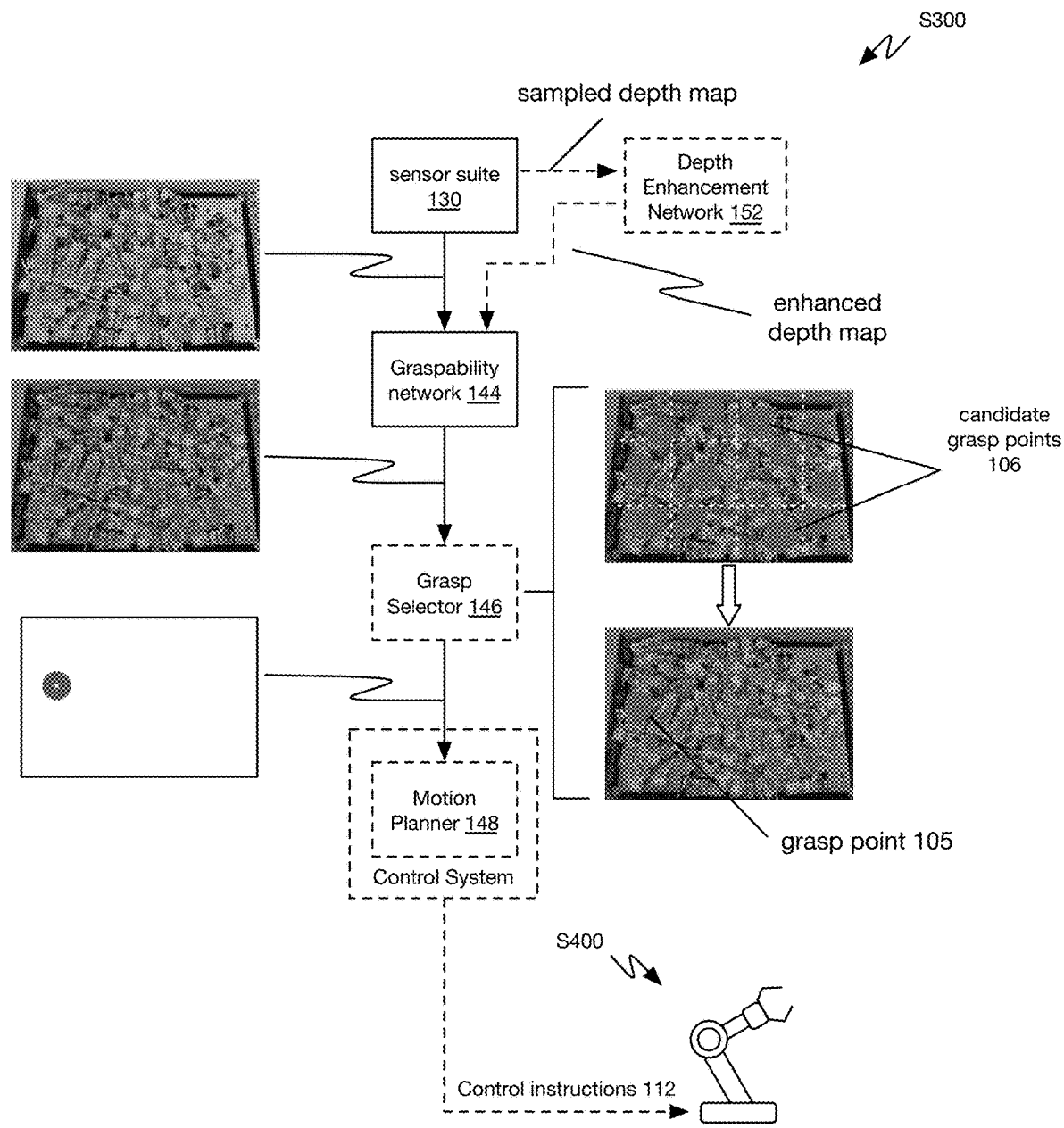
FIG. 6 is a schematic diagram of inference in a variant of the system and/or method.
Figure 7:
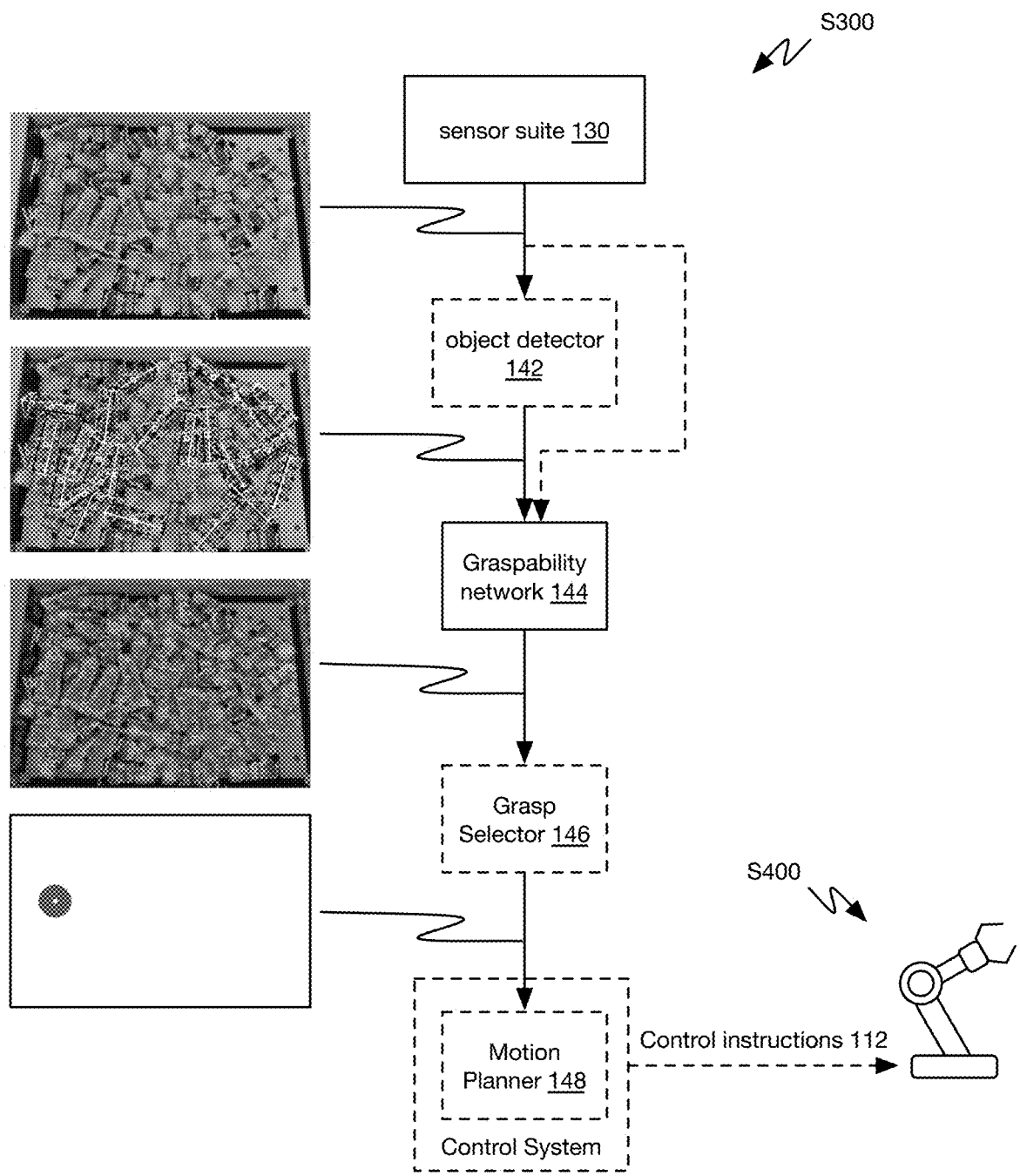
FIG. 7 is a schematic diagram of inference in a variant of the system and/or method.
Figure 8:
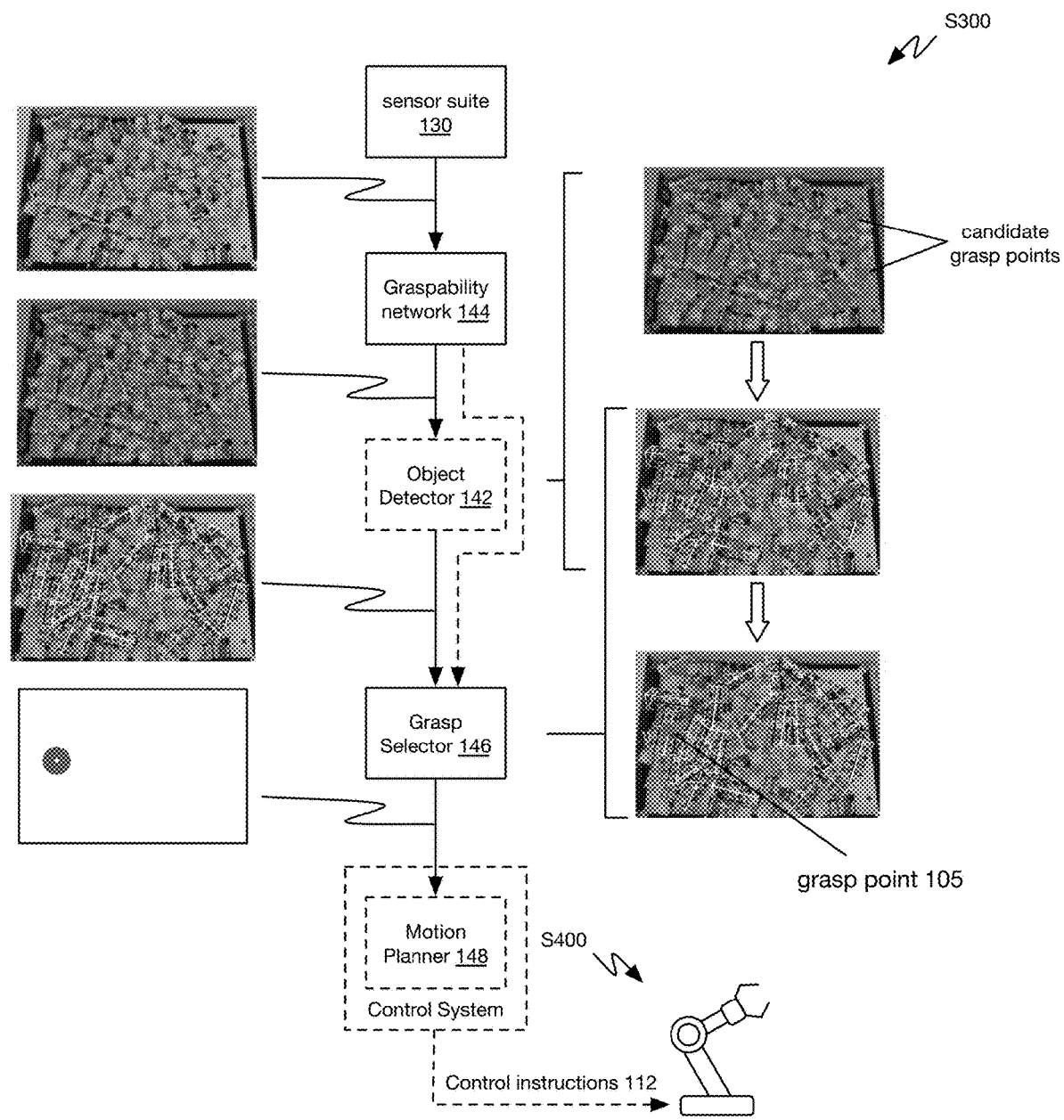
FIG. 8 is a schematic diagram of inference in a variant of the system and/or method.

The grasp points can be selected from: a set of candidate grasp points 106 (e.g., selected by an upstream candidate selection module); from the graspability map (e.g., based on values associated with the image features); and/or otherwise selected. (e.g., as generated by the graspability network). Additionally or alternatively, the grasp selector can function to select a grasp point based on a plurality of object poses and/or based on a graspability heat map (e.g., grasp score mask; examples are shown in FIGS. 6, 7, and 8).

The computing system can include a motion planner 148, which functions to determine control instructions for the robotic arm to execute a grasp attempt for a selected grasp point. The motion planner can employ any suitable control scheme (e.g., feedforward control, feedback control, etc.). The control instructions can include a trajectory for the robotic arm in joint (or cartesian) coordinate space, and/or can include any other suitable control instructions (e.g., CNC waypoints, etc.). However, the system can include any other suitable motion planner, and/or can otherwise suitably effect motion/articulation of the end effector to execute a grasp attempt.

However, the system can include any other suitable components.

4. Method

The method can include: labelling an image based on an attempted object grasp by a robot S100; and generating a trained graspability network using the labelled images S200. The method can additionally or alternatively include: determining a grasp point using the trained graspability network S300; executing an object grasp at the grasp point S400; and/or any other suitable elements. The method can optionally include generating a trained depth enhancement network S500.

The method can function to increase the accuracy of grasping an object and/or increase the object grasping speed (e.g., decrease the duration between scene image sampling and grasp execution).

The method is preferably performed by the system disclosed above, but can be otherwise performed. The method can be performed once, iteratively (e.g., for identical instances of each method element; for with distinct variants of method elements, etc.), repeatedly, periodically, and/or occur with any other suitable timing.

Labelling an image based on an attempted object grasp by a robot S100 can function to determine labelled data for training the graspability network in S200 (e.g., image set generated by repeating S100).

The images 103 can depict physical scenes (e.g., real scenes), synthetic scenes, and/or any other suitable scene. The scene 102 can include: a container 103, a surface, one or more objects 104 or no objects (e.g., the container or surface is empty), and/or any other components. The scene is preferably a 'dense' object scene, which can include a plurality of overlapping objects (e.g., where one or more objects are occluded by another object within the scene; the object scene can include a first plurality of objects that partially occludes a second plurality of objects; etc.). In a specific example, the vertical (top down) projection of a first object partially overlaps a second object within the scene. However, scenes can additionally or alternatively include sparse objects which are separated by at least a threshold distance, non-overlapping, non-occluded objects, or can include any other suitable object distribution. The image scenes preferably encompass a plurality of objects, but can additionally or alternatively encompass individual objects, no objects, and/or any other suitable object scene. The objects within the scene can be homogeneous (e.g., identical and/or duplicative instances of a particular type of object; same object class—cylinders, spheres, similar pill bottles with different labels, etc.) or heterogenous. The field of view of the image scenes can be entirely bounded within an interior of a container, can extend up to the periphery (e.g., sides) of the container (e.g., include pixels associated with the container periphery), can extend beyond a periphery of a container (e.g., include pixels not associated with the container), and/or any other suitable images. In variants, the image scene is captured with a predetermined field of view in an imaging coordinate frame and/or can be automatically/dynamically cropped to a predetermined area of interest (e.g., area within bin), and/or otherwise suitably transformed.

In variants, S100 can be performed for up to a predetermined period of time (e.g., 30 minutes, 45 minutes, 1 hour, 5 hours, overnight, 24 hours, 48 hours, 1 week, etc.). S100 can be performed before a production period, before a next production period (e.g., after a previous production period), during a production period, and/or at any other suitable time. S100 can be performed when the accuracy of the graspability network falls below a threshold (e.g., less than 99%, less than 98%, less than 95%, etc.), and/or when any other suitable condition is met. S100 can be iteratively performed, performed for a predetermined number of scenes, objects, attempts, poses, lighting conditions, duration of time, enough failure and success samples, and/or any other suitable condition is met. In a first variant, S100 can be performed during a training period (e.g., prior to production runtime). In a second variant, S100 can be used to label runtime images to update the graspability model by reinforcement learning. However, S100 can be performed with any other suitable timing.

Image labelling can occur locally (e.g., at the computing system electrically connected to the robotic arm) or remotely (e.g., determined remotely based on images and control parameters; label created at remote/cloud computing system).

Labelling an image can include: capturing an image by the imaging system; determining object parameters based on the image using an object detector; selecting a grasp point associated with an image feature and/or object parameters (e.g., associated with an image pixel; using a grasp selector); determining control instructions to grasp the grasp point; grasping at the grasp point using the robot; and labelling the image feature and/or grasp point based on the grasp outcome. The object parameters can be determined using an object detector (e.g., YOLO, RCN, etc.), which can be trained on synthetic images. The object parameters can be: object keypoints (e.g., keypoints along the object surface, bounding box corners, side centroids, centroid, etc.), object axes (e.g., major axis, minor axis, a characteristic axis, etc.), object pose, surface normal vectors, and/or any other suitable object parameters. In a specific example, the object detector can be the detector described in U.S. application Ser. No. 17/375,331 titled "METHOD AND SYSTEM FOR GENERATING TRAINING DATA" filed 14 Jul. 2021 incorporated herein in its entirety by this reference.

The grasp point can be selected based on the object parameters determined by the object detector (e.g., using an object selector), using heuristics (e.g., proximity to an edge of the object container, amount of occlusion, height, keypoint type or keypoint label, etc.). In one example, selecting the grasp point using the output of a trained object detector can include: identifying object features for each object in the scene using the detector; determining candidate grasp points based on the features; and optionally selecting a grasp point (e.g., based on a grasp score, randomly, based on a priority order, etc.; using a grasp selector; etc.) from the candidate grasp points.

The images can be labelled based on grasp outcome (e.g., grasp success or grasp failure) of an object at a point associated with a selected pixel (x, y) of the image (e.g., the physical point on an object can be mapped to the pixel in the image, the image pixel can be selected and mapped to the physical point on an object, etc.), a region of pixels, a coordinate position (e.g., sensor frame, cartesian frame, joint frame, etc.), detected object region, and/or other suitable image features/coordinates. Additionally or alternatively, an object pose (and/or an image thereof) can be labelled with an outcome for a grasp point in the object coordinate frame. In some variants, only a portion of the image may be labelled (e.g., the image may be cropped around an object region or a boundary of an object container) or a portion of the image may be excluded (e.g., not labelled and/or not used during training). Additionally or alternatively, the images can be labelled with end effector parameters (e.g., gripper state, grasp pressure/force, etc.). However, images can be otherwise suitably labelled in any suitable coordinate frame and/or with any other suitable features/characteristics.

The label can be a single class label per pixel, such as a binary label (e.g., 1 for grasp success, 0 for grasp fail, etc.), a percentage (e.g., grasp success likelihood, such as calculated from prior attempts to grasp points similar to the selected grasp point), and/or any other suitable label; a multi-class label per pixel, such as binary labels for different angles of arrival at a particular point on the object, grasp success score (e.g., calculated based on resultant in-hand pose, force feedback, insertion accuracy, etc.); and/or any other suitable label. The label can optionally include a label for: the object parameters for the point (e.g., as output by the object detector, such as the surface normal, a face tag, etc.), gripper parameters determined from the grasp planner (e.g., or an index associated therewith, such as an end effector pose), and/or other parameters. Gripper parameters preferably include one of a set of candidate bins/indices of parameter values (e.g., 1°-30°, 31°-60°, 61°-90°, 91°-120°, 121°-150°, 151°-180°, etc.), but can alternatively be a continuous parameter value, a continuous parameter value determined within a bin of values, and/or any other suitable representation of the robotic manipulator parameter value. However, the label can include any other suitable parameters. The labelling can include labelling the image feature depicting the grasp point (e.g., selected grasp point, grasp point that was actually grasped, the physical point corresponding to the grasp point, etc.) and/or labelling a physical (3D) point in the scene (e.g., in a cartesian/sensor coordinate frame, joint coordinate frame, etc.).

The pixels within a predetermined distance (e.g., up to 2 pixels, up to 3 pixels, up to 5 pixels, etc.) to the selected pixel can be labelled with the same label as the selected pixel, weighted (e.g., based on the distance away from the pixel, based on proximity to a container edge, etc.), or not labelled.

The selected pixel for the grasp attempt is preferably determined automatically, such as: using an object detector in conjunction with a grasp selector, according to a set of heuristics (e.g., random sampling, etc.), according to S300 (e.g., for reinforcement learning), and/or in any other suitable manner.

The control instructions can be determined by a grasp planner, which can determine a robotic end effector path, robotic end effector pose, joint waypoints (e.g., in cartesian/sensor coordinate frame, in a joint coordinate frame, etc.), and/or any other suitable control instructions.

The robot executing a grasp attempt for image labelling in S100 can be: the same robotic arm which will employ the robot during production (e.g., training data generated for an individual robot) or a duplicative instance thereof, a different robotic arm (e.g., using the same type of end effector; a dedicated training robot; etc.) and/or any other suitable robot. The grasp attempt is preferably performed by S400 (and/or using a motion planner), but can be otherwise suitably executed, such as based on a predetermined training sequence. The grasp outcome for the selected grasp pixel is preferably determined based on the type of end effector performing the grasp attempt.

The grasp outcome (success or failure) can be determined using any suitable set of actuation feedback sensors (e.g., force sensor, strain gage, load cell, etc.) and/or imaging system sensors (e.g., camera).

In a first example, when the end effector is a suction gripper, a pressure measurement device can measure the pressure. When the pressure change is above a threshold, the grasp point can be labelled as a grasp success and otherwise labelled as a grasp failure. If the pressure change is above a threshold for less than a predetermined period (e.g., before an instruction to drop the object), then the grasp point can be labelled as a grasp failure (e.g., the object was grasped and dropped).

In a second example, when the end effector is a finger gripper, a grasp outcome can be determined based on the finger gripper state. The grasp point can be labelled as a grasp failure when: the finger gripper is closed, the finger gripper is open beyond a predetermined width, if the force between fingers is less than a threshold, and/or any other suitable condition. The grasp point can be labelled as a grasp success when the force between fingers is above a predetermined threshold, if the gripper is open to within a predetermined width (e.g., associated with the width of an object), and/or any other suitable condition.

Additionally or alternatively, the grasp outcome can be automatically determined using a set of sensors of the sensor suite (e.g., feedback sensing, direct detection of end effector state, imaging). In a first example, the grasp outcome can be determined based on receipt/placement of an object at an insertion bin. In a second example, the grasp outcome can be determined by a visual detection of object transformation (e.g., using the imaging system). However, the grasp outcome can alternatively be determined manually (e.g., by a human supervisor), and/or otherwise suitably determined.

Images are preferably labelled with exactly one grasp point (or a selected pixel/region associated therewith) and exactly one grasp outcome (i.e., binary success or failure). However, in variants, training images can be labelled with a plurality of grasp outcomes (e.g., a grasp outcome for each of a plurality of grasp points), and/or otherwise suitably labelled. The images can optionally be a labelled with: object parameters associated with the grasp point/pixel (e.g., as determined by the object detector and/or grasp planner), such as: a surface normal vector, a face tag, an object principal axis pose; an end effector pose (e.g., as determined by a grasp planner; an index associated therewith, such as an index along a kinematic branch for the robotic arm; in joint space, in cartesian space, etc.), and/or any other suitable label parameters.

S100 can optionally include expanding and/or augmenting a set of training images by applying image transformations (e.g., rotations, mirroring, etc.) to a labelled image, such that both the original (untransformed) image and/or the transformed image can be stored (e.g., in a training data repository 106) and/or used for training (e.g., in S200). In a first example, training images can be augmented by mirroring a labelled training image (e.g., doubling the set of training images). In a second example, training images can be augmented by rotating a labelled training image (e.g., by 90 degrees, by 180 degrees, and/or by 270 degrees; quadrupling the set of training images; etc.).

However, the images can be otherwise labelled.

Generating a trained graspability network using the labelled images S200 can function to generate a set of weights for the graspability network. S200 can be performed by the computing system, and/or any other suitable system. S200 can be performed locally at the robot, at a remote computing system, and/or performed at any other suitable location.

Figure 14:
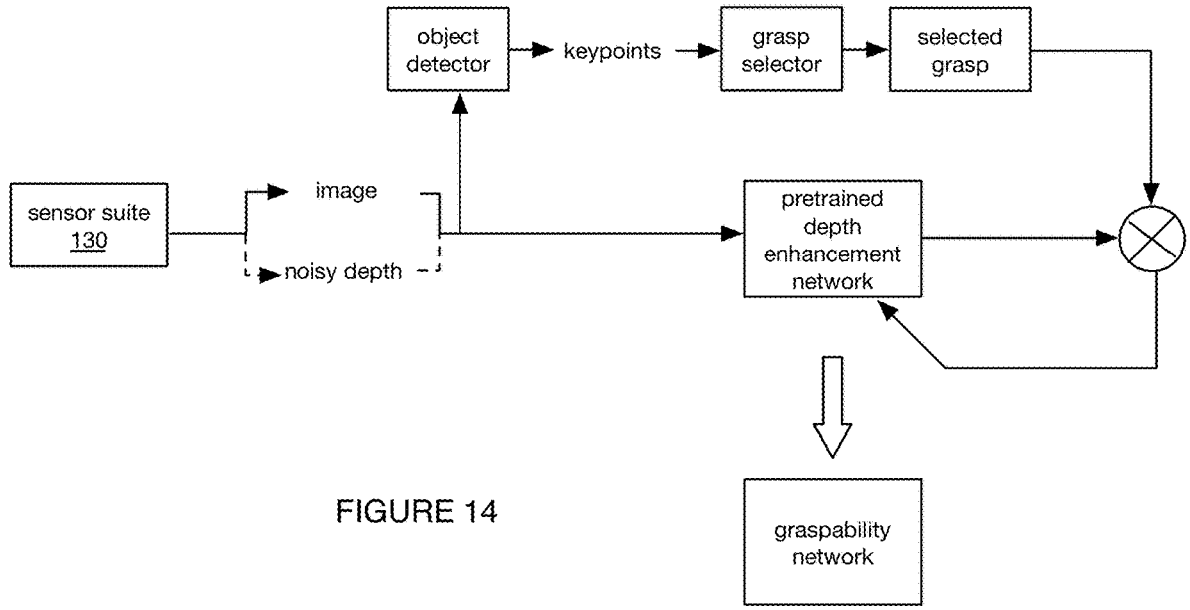
FIG. 14 is a schematic representation of a specific example of generating the graspability network.

The network trained in S200 can be a previously untrained network or a pretrained network. In some variants, the network trained in S200 can be pretrained for another task (e.g., depth enhancement), for another domain (e.g., optical character recognition, etc.), previously trained using a prior instance of the method for another object (e.g., within the same object class), and/or can be another pretrained network. In a first example, a pretrained network can be a depth enhancement network trained to generate an accurate (and/or dense, refined, etc.) depth map given an input image and noisy depth information for a scene (example shown in FIG. 14).

The input to the graspability network can include: an RGB image, receptive field from image, optionally depth, optionally object detector output (e.g., object parameters, etc.), and/or any other suitable information. In a first variant, the input to the graspability network is a 2D image having 3 channels per pixel (i.e., red-green-blue; RGB). In a second variant, the input to the graspability network can be a 2.5D image having 4 channels per pixel (RGB-depth image). In a first example, the depth can be a sensed depth (e.g., from a lower-accuracy sensor or a higher-accuracy sensor such a Lidar). In a second example, the depth can be a 'refined' depth determined by a trained depth enhancement network (e.g., wherein the depth enhancement network can be a precursor neural network or form the initial layers of the graspability network; etc.). In a third variant, the input to the graspability network can include an object detection output as an input feature (e.g., an object parameter, such a characteristic axis of a detected object). However, the graspability network can be trained to operate with any suitable set of inputs.

The graspability network can output a graspability map (e.g., a grasp heatmap), grasp score (e.g., per pixel, per object, etc.), pixel selection, and/or any other suitable information. The graspability map preferably includes a grasp success probability for each image feature (e.g., pixel (i, j), superpixel, pixel block, pixel set, etc.), but can alternatively include a grasp failure probability, a grasp score, object parameters (e.g., wherein the network is trained based on the object parameter values for the grasp points; such as object surface normals), end effector parameters (e.g., wherein the network is trained based on the robotic manipulator parameters for the training grasps; such as gripper pose, gripper force, etc.), a confidence score (e.g., for the grasp score, grasp probability, object parameter, end effector parameter, etc.), and/or any other suitable information for any other suitable portion of the image (examples shown in FIG. 4 and FIG. 5). The image feature can depict a physical region: smaller than, larger than, substantially similar to, or otherwise related to the robotic effector's grasping area.

The graspability map is preferably dense (e.g., includes values for more than a threshold proportion of the image or image pixels, such as more than 50%, 60%, 70%, 80%, 90%, 99%, etc.), but can alternatively be sparse (e.g., includes values for less than a threshold proportion of the image or image pixels, such as 30%, 20%, 10%, etc.; one per object as detected by an object detector). In variants, the graspability map can span pixels associated with and/or directed towards a plurality of objects of an object scene (e.g., overlapping objects, occluded objects, etc.), but can be otherwise suitably configured.

The graspability map is preferably related to the object detections (e.g., output by the object detector) via the image (e.g., via the image features of the image), but can alternatively be related to the object detections through the physical scene (e.g., wherein both the object detections and the grasp scores are mapped to a 3D representation of the scene to determine object parameter-grasp score associations), be unrelated, or be otherwise related. For example, an object pose (e.g., output by the object detector) for an object depicted by a set of pixels is associated with the grasp score(s) (e.g., output by the graspability network) for the pixels within the set. However, the graspability map and object detector outputs can be otherwise related.

The graspability network can be trained using supervised learning (e.g., using the outcome-labelled grasp points in the images as the labeled dataset), unsupervised learning, reinforcement learning (e.g., by grasping at the scene and getting a reward whenever the grasp was successful), and/or otherwise trained. The graspability network can be trained using a binary cross-entropy loss (e.g., applied only at pixels for which there is ground truth, all pixels, etc.), Dice loss, Shape Aware loss, Combo loss, and/or any other suitable loss function. The graspability network can be pretrained (e.g., on a plurality of objects, on similar objects as the target object in the scene, on dissimilar objects, etc.), and/or untrained. The graspability network can be pretrained using one or more image datasets (e.g., open images, MS-COCO, etc.), and/or any other suitable information. The graspability network can be trained for a single object type or a set of object types (e.g., a class of objects), or can be generic. In a specific example, S200 can build a dedicated model for a particular object class (e.g., a particular product, such as a bin of assorted pill bottles).

The graspability network can be trained for up to predetermined period of time (e.g., 30 minutes, 45 minutes, 1 hour, 5 hours, overnight, 24 hours, 48 hours, 1 week, etc.), after the graspability network achieves a threshold accuracy (e.g., over 95%, over 98%, over 99%, etc.), and/or for any other suitable period. The graspability network can be generated before a production period, during a production period, before a next production period (e.g., after a previous production period), iteratively as new grasps are performed, after a predetermined number of grasp attempts have been performed, and/or at any other suitable time. The graspability network can be generated after labelled images are generated in S100, in parallel with S100 (e.g., each time an image is labelled, using the image to train the graspability network, etc.), and/or generated at any other suitable time.

The graspability network is preferably trained based on the labelled images. The labelled images can include: the image (e.g., RGB, RGB-D, RGB and point cloud, etc.), grasp point (e.g., the image features depicting a 3D physical point to grasp in the scene), and grasp outcome; and optionally the object parameters (e.g., object pose, surface normal, etc.), effector parameters (e.g., end effector pose, grasp pose, etc.), and/or other information. In particular, the graspability network is trained to predict the outcome of a grasp attempt at the grasp point, given the respective image as the input. However, the network can additionally or alternatively be trained based on object parameters and/or robotic manipulator parameters, such as may be used to: train the graspability network to predict the object parameter values (or bins) and/or robotic manipulator parameter values (or bins), given the respective image as input. However, the graspability network can be otherwise suitably trained.

S200 optionally includes evaluating the labelled images, modifying the labelled images based on the heuristics, and training the graspability network using the modified labelled images. Evaluating the labelled images functions to determine whether the training data is balanced (e.g., the number of successful grasps is no more than twice the number of failed grasps, the number of successful grasps is the same as the number of failed grasps, etc.). In a first example, a heuristic can include, of the labelled images from S100, using no more than twice of one class compared to the other class (e.g., no more than twice the failed grasp examples compared to the successful grasp examples, no more than twice the successful grasp examples compared to the failed grasp examples, etc.). In a second example, a heuristic can include weighting samples of the class with fewer samples. In a third example, a heuristic can include: when the number of successful examples is greater than the number of failed examples, the system can capture images of the empty container or surface and label the image as failed (e.g., no objects in the scene to grasp). In a fourth example, a heuristic can include rotating labelled images to create new labelled images based on the existing labelled images. In a fifth example, a heuristic can include augmenting the color in the labelled images to create new labelled images. In a first variant, generating the trained graspability network can include training the graspability network using one or more algorithms (e.g., gradient descent, SGD with or without momentum, Adam, RMSprop, Genetic algorithm, etc.). However, the graspability network can be trained using any suitable set of images.

Figure 4:
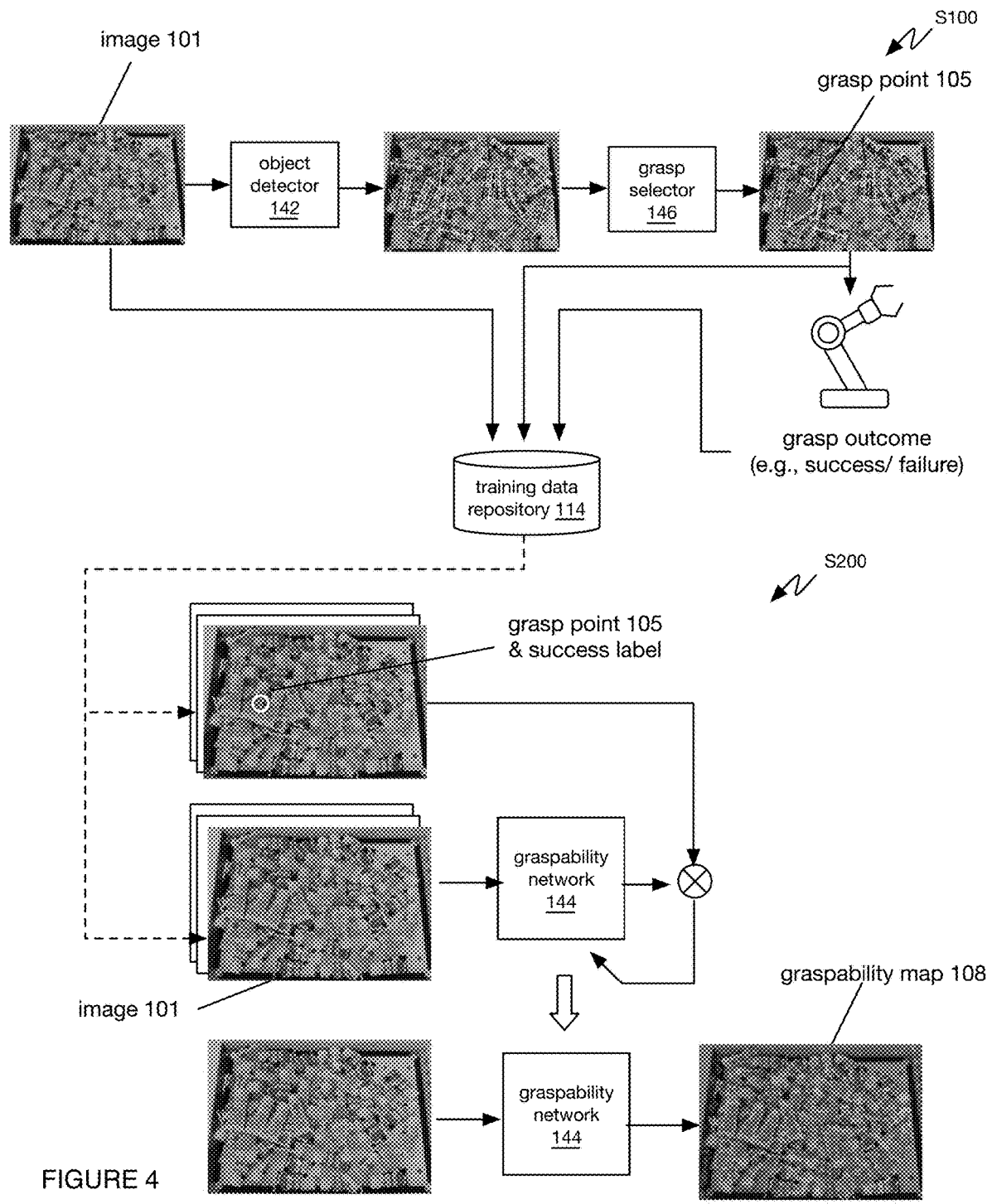
FIG. 4 is a flow chart diagram of training data generation and neural network training in a variant of the method.
Figure 5:
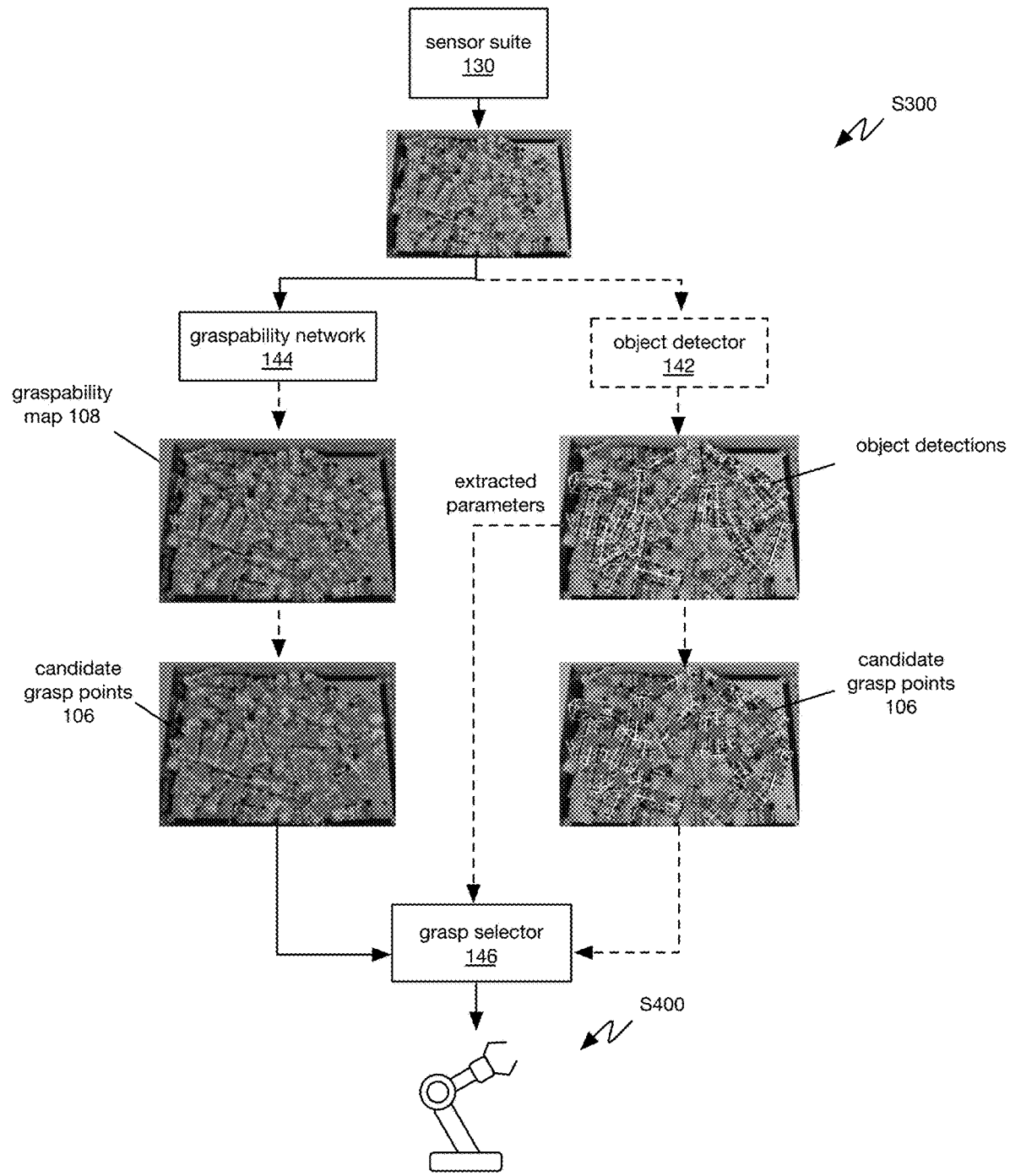
FIG. 5 is a schematic diagram of inference using the trained neural network in a variant of the method.

The graspability network can be actively trained using an object detector and exploratory grasp selector heuristics (an example is shown in FIG. 4) and/or by manual user selection. For example, the graspability network can be trained using active learning methodologies, where the graspability network (or another network) can select grasp examples that the graspability network should be trained on, and the result of the grasp execution (and/or the grasp selected based on the object detector output) can be used to label the grasp. Additionally or alternatively, the graspability network can be validated and/or updated (e.g., reinforcement learning with exploratory grasps). This can be performed: periodically, after a threshold number of successful grasps have been achieved, after a threshold number of failed grasps have been achieved, after the runtime grasp success rate falls below or rises above a threshold, and/or at any other suitable time. Network validation and/or refinement can include: verifying that grasp points with a low probability of success actually result in failed grasps; increasing the prediction confidence for certain predictions, and/or otherwise validating or updating the network. This can include: capturing an image; using the trained graspability network to determine a heatmap using the image as input; selecting an exploratory grasp point (e.g., using a grasp selector and/or heuristics associated with active training; according to S300); determining the grasp outcome for the grasp point; labelling the grasp point with the grasp outcome; and training the model (e.g., training online) with the new labelled image. The exploratory grasp can be selected from the graspability network output using: a set of heuristics, a ruleset, an equation, a decision tree, a random selection method, and/or any other suitable selection method. The selected grasp point can be the point with the highest probability of success (e.g., if there is a tie, randomly select a point with the highest probability), a point with more than a threshold probability of success (e.g., more than 90%, 80%, 70%, 60%, 40%, 30%, etc.), a point with less than a threshold probability of success (e.g., to verify that that the grasp is truly ungraspable; less than 90%, less than 80%, less than 70%, less than 60%, less than 40%, less than 30%, etc.; example shown in FIG. 11), a grasp with a low prediction confidence score (e.g., less than 60%, 50%, 40%, 30%, 10%, etc.), and/or otherwise selected.

Figure 11:
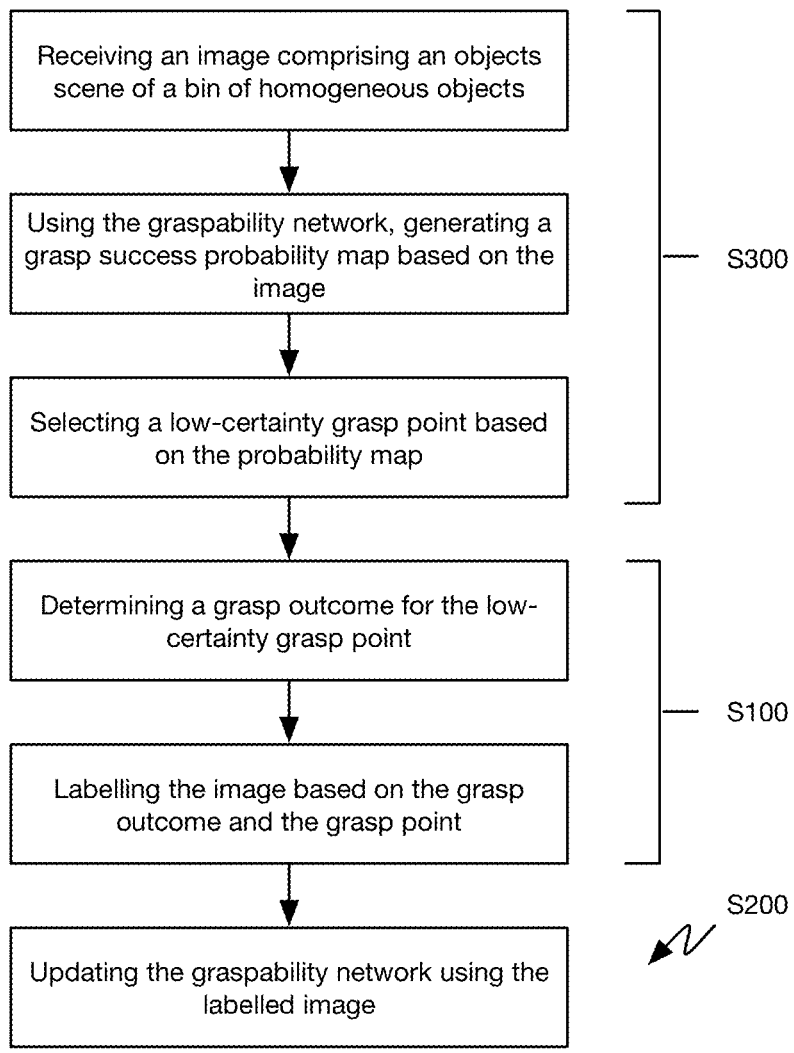
FIG. 11 is a diagrammatic example of a variant of the method.
Figure 12:
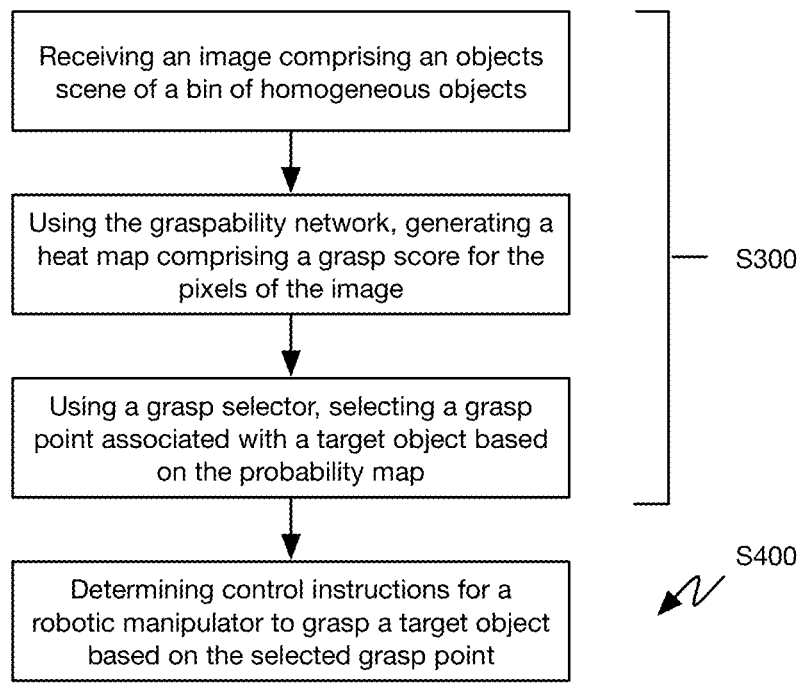
FIG. 12 is a diagrammatic example of a variant of the method.

In a first example, the grasp point (e.g., used for training, labelling) is selected by the grasp selector based on a success probability being below a threshold value. In a second example, the grasp point is selected based on a confidence score (e.g., for the success probability) being below a threshold value (an example is shown in FIG. 11).

However, the graspability network can be otherwise generated.

Selecting a grasp point using the trained graspability network S300 can function to determine where to grasp a particular object in the scene. The grasp point can be selected by the grasp selector and/or the graspability network.

In some variants (e.g., 'active training'), selecting the grasp point can be performed using a grasp selector. In some variants (e.g., 'runtime'/'inference'; reinforcement learning), selecting the grasp point can be performed using the graspability network (e.g., the graspability network selects the grasp points; the grasp points are selected based on the outputs of the graspability network). In some variants, the grasp point can be selected by a failure hysteresis and/or loss function to avoid selecting points (e.g., by selective weighting, blacklisting, etc.) based on the proximity to a recent grasp failure.

Selecting a grasp point can include selecting a plurality of grasp points using one or more of the techniques described below. The grasp point can be an (x, y) location in an image associated with a physical point in the physical scene. However, the grasp point can be a physical 3D point in the physical scene, and/or otherwise defined.

Selecting a grasp point can be performed during a production period (e.g., >3 hours, >5 hours, >8 hours, >12 hours, etc.), performed multiple times during production period, and/or performed at any other suitable time. S300 is preferably performed after training (e.g., during runtime or inference), but can be performed at any other suitable time (e.g., such as during active training). S300 is preferably iteratively performed on new images of the scene (e.g., wherein the scene can change or be static), but can alternatively be performed on old images of the same or different scene, synthetic images, and/or any other suitable set of images.

S300 can include: capturing an image of a scene during runtime (e.g., same field of view as training image, difference field of view training image); determining a graspability map (e.g., mask, heatmap, etc.) for the image using the trained graspability network; and selecting a grasp based on the graspability map (e.g., where a grasp can be an image feature).

The trained graspability network receives the image (e.g., RGB, RGB-D) as an input, and can additionally or alternatively include object detector parameters as an additional input (an example is shown in FIG. 7). The trained graspability network can output: a graspability map (e.g., including a dense map of success probabilities, object parameter values, and/or robotic end effector parameter values) and/or a success probability for multiple objects' grasps (e.g., multiple points/pixels), and/or any other suitable outputs.

The grasp selector preferably receives the outputs from the graspability network and selects a grasp based on the graspability map. The grasp can be a pixel (or point associated therewith) and/or a set thereof (e.g., contiguous pixel set cooperatively representing a physical region substantially similar to the robotic manipulator's grasping area).

In a first variant, selecting the grasp point with the highest likelihood of success on the graspability map. When there is a tie, the grasp selector can: randomly select a grasp point from those with the highest likelihood of success, select the grasp point based on heuristics (e.g., closest to the center of the image, closest to the current effector position, furthest from an edge of the scene or bin, etc.), select the grasp points corresponding to objects that were selected based on the object detector's output, and/or otherwise prioritize or select high-probability grasps. Alternatively, the grasp selector can select any grasp point with more than a threshold probability (e.g., 50%) of success.

Figure 10:
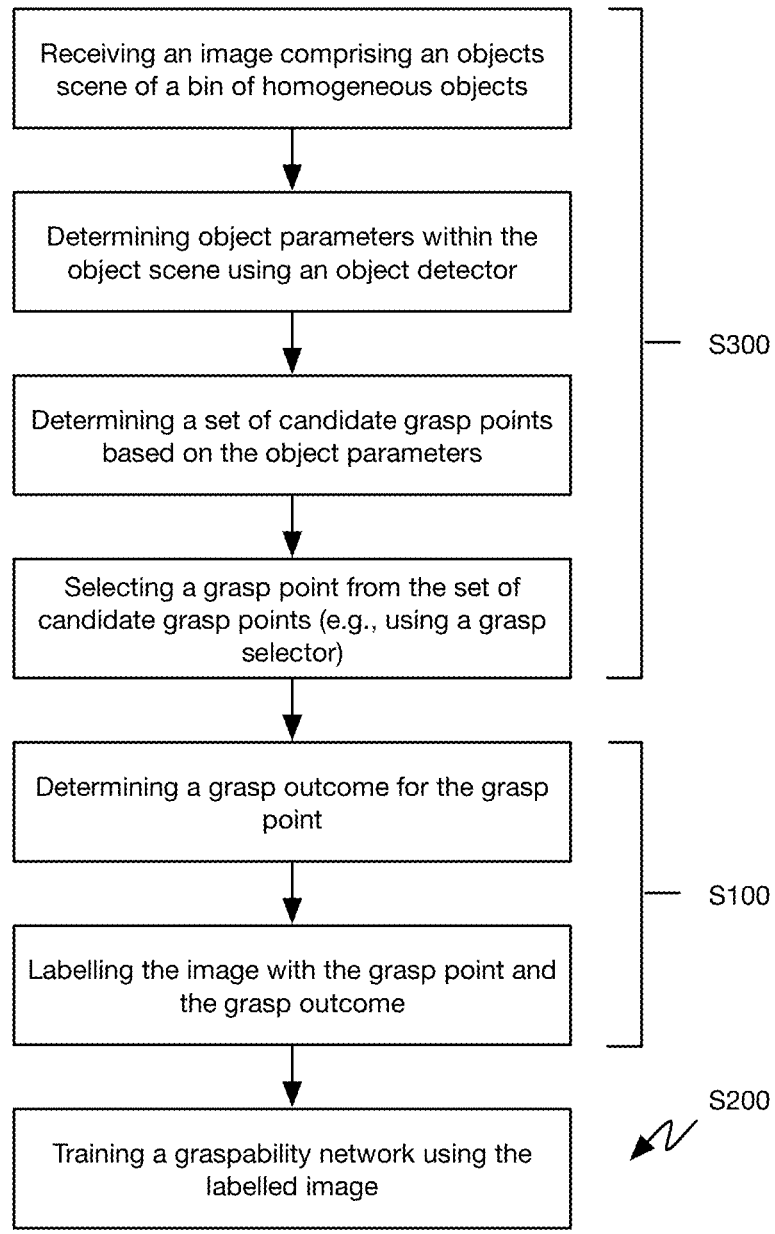
FIG. 10 is a diagrammatic example of a variant of the method.

In a second variant, selecting the grasp point can include: determining a set of candidate grasp points; weighting each candidate grasp point according to the grasp point generation method (e.g., from the graspability network, from the object detector, etc.) and/or determining a score for each candidate grasp point; and selecting and/or ranking a candidate grasp point from the set based on the weight and/or score. The set of candidate grasp points can be determined: from the heatmap generated by the trained graspability network, from the one or more object detector networks (e.g., RCN, YOLO, etc.; an example is shown in FIG. 10)

trained to determine object features and generate grasp points from the features, randomly, and/or otherwise determined.

Determining the candidate grasp points from the graspability map can include: picking points with continuous local maxima/minima finder; picking up to a predetermined number of points associated with the highest likelihood of success (e.g., 10, 20, etc.); picking points with a maximum success probability within each of a set of image subregions or pixel regions (e.g., a grid cell, predefined region, dynamically calculated region based on detected objects, etc.; an example is shown in FIG. 6; using a grid search for local maxima within each grid cell from a graspability map; etc.), and/or otherwise determined.

In a first example, the candidate grasp points can be determined from the heatmap and selected using heuristics (e.g., scored based on the heuristics, selecting the grasp point with the highest score). Examples of heuristics that can be used include: the probability of effector collision with the container, the estimated surface normal for the grasp point (e.g., determined from the image's depth information, from the object detector output, etc.), the historical probability of success for the region (e.g., physical scene region and/or image region), and/or other heuristics. In a second example, the candidate grasp points can be determined from the object detector output (e.g., using heuristics) and selected using the probability of success of the corresponding point in the graspability map to rank the candidates within the set of grasp attempts. In a third example, candidate grasps can be independently identified using both the heatmap and the object detector outputs, aggregated, scored using heuristics, wherein the grasp selector selects the candidate grasp with the highest score.

The candidate grasp points can be weighted and/or scored based on failure hysteresis, which weights candidate grasp points based on the outcome of recent attempted grasps (e.g., based on proximity, such as within a threshold number of pixels; based on a distance from the previously selected grasp point; applying a heuristic to blacklist a particular region, etc.). In a specific example, candidate grasps can be weighted using a failure hysteresis rule for a sliding temporal window of recent grasp attempts (such as last 10 picks).

The candidate grasp points can be weighted and/or scored based on a collision avoidance rule (e.g., which may be implemented in conjunction with a motion planning step and/or determined based on a motion planner).

The candidate grasp points can be weighted and/or scored based on an exploration rule (e.g., periodic, when a threshold number of successful grasps have been executed within a predetermined threshold time duration, randomly, etc.), which can selectively favor (e.g., with greater relative weight/score) low confidence grasp points (e.g., image features) to increase confidence in the prediction for said grasp point, high confidence grasp points (e.g., validate model's prediction), grasp points which have disagreement between multiple outcome prediction modalities (e.g., an object detector pipelines and the graspability network probability map; the graspability network and a secondary network being trained based on the graspability network; etc.), and/or any other type(s) of exploration points/pixels. Exploration grasp points can be used to actively train the graspability network, or otherwise used. In some variants, exploration pixels can be selected based on exploratory heuristics, such as setting a predetermined proportion of high confidence, low confidence, uncertain outcome (e.g., an example is shown in FIG. 11). In a specific example, grasp points can be selected based on having: the highest probability of success (e.g., if there is a tie, randomly select a point with the highest probability), less than a threshold probability of success (e.g., less than 90%, less than 80%, less than 70%, less than 60%, less than 40%, less than 30%, etc.; 25%-75%), maximum uncertainty, and/or any other suitable characteristics.

In a first example, the grasp point can be selected as the point with the highest success probability. In a second example, the grasp point is selected using an object detector output and validated against the trained graspability network's output (e.g., picking a new point if the grasp success score falls below a threshold, etc.). In a third example, the grasp point is selected from a set of candidate points determined from the graspability map (e.g., based on grasp success probability) by: determining object parameters corresponding to each of the set of candidate grasp points using an object detector, and selecting a grasp point from the set of candidate points based on the grasp success probability and the object parameters.

However, the grasp point can be otherwise selected.

Executing an object grasp at the grasp point S400 can function to grasp an object at the grasp point selected in S300. S400 can be performed for a predetermined number of grasp points selected in S300 and/or for a single grasp point selected in S300. S400 can be performed based on the output of the graspability network from S300, the grasp point selected in S300, and/or based on any other suitable information.

The grasp is preferably executed by the computing system and/or the robot (e.g., with the same end effector used to generate the labelled images or a different end effector). The robot and end effector can execute the grasp using direct execution; closed loop visual servoing, such as iteratively improving feature location based on better centered and more close up images until grasp success; and/or any other suitable technique.

Executing the object grasp can include: planning a grasp for the grasp point and executing the grasp.

Planning the grasp can include determining a grasp pose, where the grasp is planned based on the grasp point and the grasp pose. In a first variant, the grasp pose can be determined from the object parameters output by an object detector (e.g., running in series and/or parallel with the graspability network/grasp selector, based on the same or a contemporaneously-captured image), and planning the grasp for the object parameters for the detected object that encompasses (e.g., includes, is associated with) the grasp point. In a first example, the grasp pose can be determined for the object associated with a grasp point (or a pixel region encompassing the grasp point) as an object detector output. For instance, the grasp pose can be determined prior to selection of the grasp point (e.g., in parallel with generation of the graspability map), prior to generation of the graspability map (e.g., as an input to the graspability network), after generation of the graspability map (e.g., as an element of grasp selection), after selection of the grasp point, and/or with any other suitable timing. In a second variant, the grasp pose can be determined as an output value (or bin) associated with the pixel representing the grasp point (e.g., where the graspability network outputs an estimate of a surface normal at the grasp point or a bin associated therewith; where the graspability map estimates an end effector pose at the grasp point or a bin associated therewith; etc.).

Planning the object grasp can include calculating a trajectory by performing motion planning (e.g., from a current end effector position to the pre-grasp pose and from the pre-grasp pose to the grasp pose; from a current end effector position to the grasp pose, etc.) for the grasp point and/or the grasp pose. A grasp pose can be a pose for an end effector to grasp the object at the grasp point (e.g., 3D end effector position, orientation, etc.); a pre-grasp pose can be a pose for the end effector a predetermined distance away from the grasp point (e.g., up to 5 cm, 10 cm, 15 cm, 20 cm, etc.). The grasp pose can be predetermined (e.g., vertically aligned), aligned with a surface normal at the point (e.g., as an object parameter values/bins), orthogonal to a surface normal, directly estimated as a robotic manipulator parameter value (or bins) for the point (e.g., by the graspability network), calculated based on the object parameters (e.g., using a separate set of algorithms, heuristics, etc.), and/or otherwise suitably determined.

Figure 9:
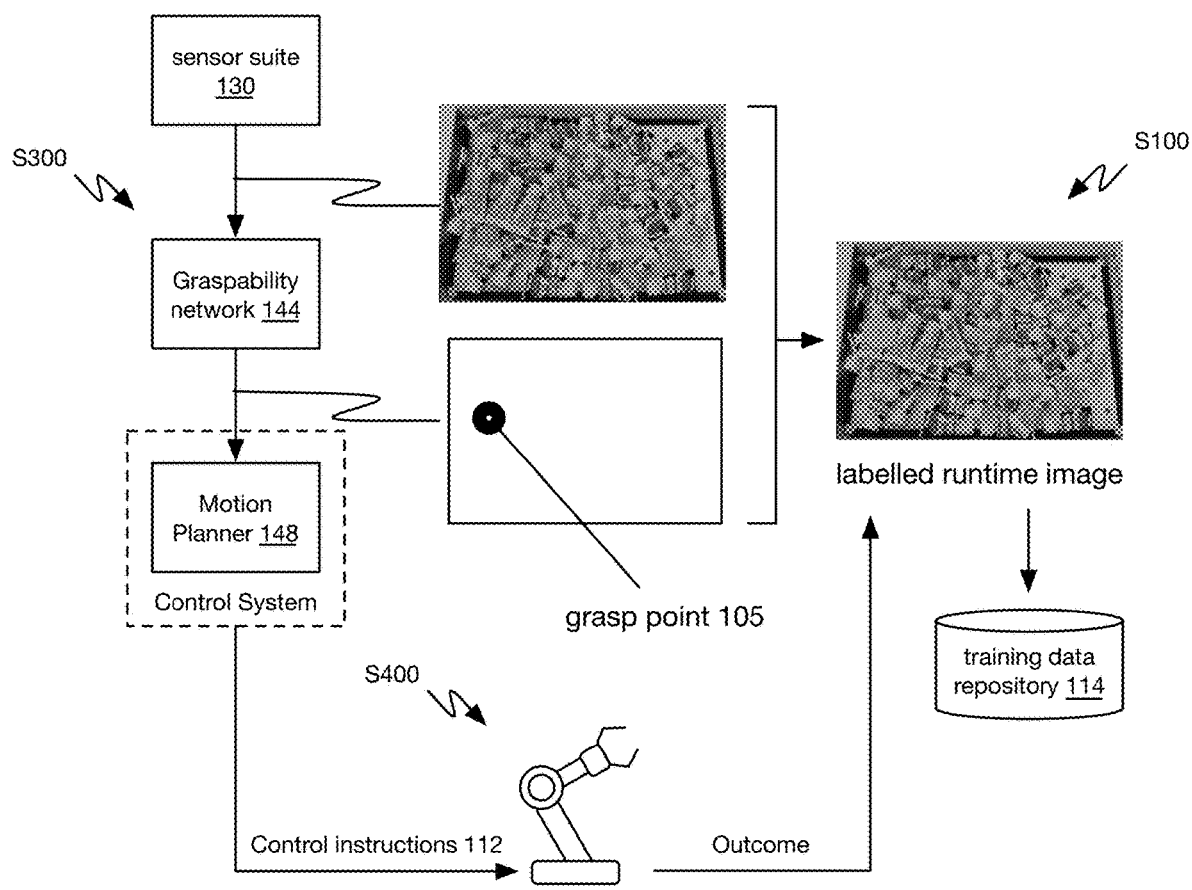
FIG. 9 is a schematic representation of reinforcement learning in a variant of the system and/or method.

Executing the object grasp can optionally include labelling the grasp point based on the grasp outcome (e.g., label the point with a 0 for grasp fail and a 1 for grasp success, or any other suitable label), the angle of arrival, and/or otherwise labelling or not labelling the grasp point. In variants, the grasp outcome can be used for subsequent updating and/or retraining of the graspability network and/or object detector network, an example is shown in FIG. 9.

Executing the object grasp can optionally include determining a next trajectory for a next grasp point while executing the object grasp. The next grasp point can be the grasp point with the next best score, randomly selected, and/or otherwise selected based on the output of the graspability network from S300 (e.g., using the object selector).

However, the object grasp at the grasp point can be otherwise executed.

The method can optionally include generating a trained depth enhancement network S500. The depth enhancement network can be used to refine inputs (e.g., depth estimates) prior to passing them to the graspability network, can be used as an initial layer of the graspability network, can be the basis for the graspability network (e.g., using transfer learning; wherein the pretrained network is trained to generate the graspability map; etc.), and/or be trained and/or used in any other suitable portion of the processing pipeline.

The depth enhancement network can be trained using the same images and/or different images as used to train the object detector and/or graspability network. The depth enhancement network can be the same type of neural network (e.g., FCN, CNN) as the graspability network, but can alternatively be a feed forward network, a clustering algorithm, and/or any other suitable machine learning model or neural network.

Figure 13:
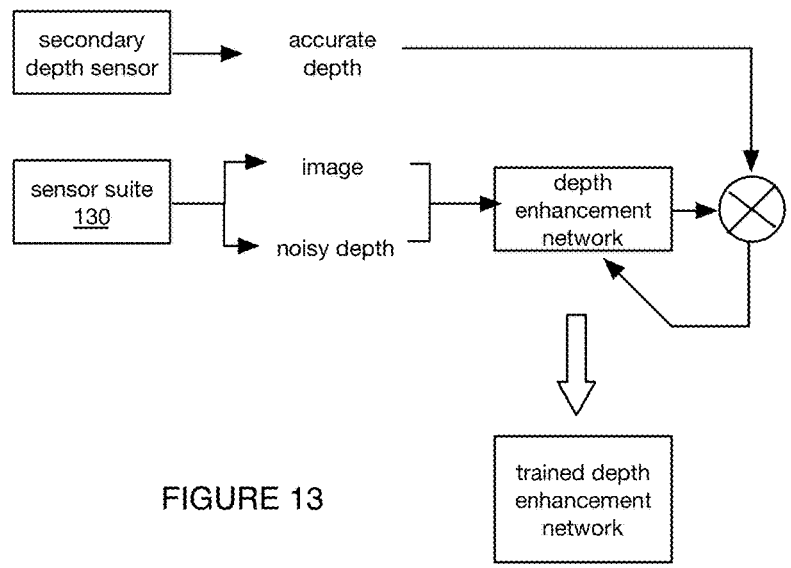
FIG. 13 is a schematic representation of generating a pretrained depth enhancement network.

The depth enhancement network is preferably trained with images (e.g., same type of input image as received by the graspability network; noisy images; etc.), and a target depth map (example shown in FIG. 13). The target depth map preferably includes depth measurements taken with a secondary sensor (e.g., not employed during production runtime; Lidar, laser range imaging, etc.). The target depth map can have greater accuracy, precision, measurement density, and/or other metric as compared to the coarse depth map. The sensor associated with the target measurements can be removed after the training time, or else only provided in an initial training setting.

The inputs to the depth enhancement network can include: an RGB image, a receptive field from an image, a noisy depth map (e.g., the same type of depth input as received by the graspability network), a coarse depth map (e.g., coarse depth measurements for each or a plurality of pixels of the image), an object detector output, and/or any other suitable data input. The outputs of the trained depth enhancement network are a refined depth map (e.g., refined depth map for the image or a portion thereof), wherein the refined depth map can be more: accurate, dense, or otherwise refined relative to the input depth map.

A depth enhancement network can be trained based on: test images of a scene, noisy depth information of the scene (e.g., sampled using the runtime depth sensor), and accurate depth information of the scene (e.g., generated using a higher-accuracy or higher-density sensor, such as lidar, a stereoscopic system, etc.), and/or other training data. However, the graspability network can be trained from any other suitable network (e.g., an untrained network with random weights).

The depth enhancement network can be pretrained (e.g., on a plurality of objects, on similar objects as in the scene, on dissimilar objects, etc.) and/or untrained prior to S500. S500 can occur: prior to S300, synchronously with S300, asynchronously with S300, in series with S300 (e.g., prior to S300 and/or as the basis for S300), in parallel with S300 (e.g., using the same set of images), and/or with any other suitable timing. For example, the depth enhancement network can be trained before S300, and used as the basis for the graspability network in S300 (e.g., wherein the graspability network is trained using transfer learning).

The depth enhancement network can be trained on the same or different computing system as that used to train the graspability network. The depth enhancement network can be trained in a centralized system, distributed system, remote system, local system (e.g., local to the robot), and/or other system. For example, the depth enhancement network can be trained in a cloud computing system (e.g., remote system), while the graspability network is trained on a local system (e.g., the depth enhancement network is tuned on the local system).

Alternatively, the system and/or method can be employed without a depth enhancement network—such as by passing noisy depth measurements directly into the graspability network as a depth input and/or where the graspability network does not receive a depth input and/or include a depth feature/channel.

Alternatively, the depth enhancement network can be employed independently from the graspability network to generate a refined depth map from a coarse depth map and an image (e.g., before providing the coarse depth map and image to the graspability network and/or object detector).

A depth enhancement network can be particularly advantageous when employed for objects having a smallest characteristic dimension within a threshold of a pixel granularity (e.g., less than a threshold number of pixels spanning the object in the smallest characteristic dimension, such as: 5, 10, 50, 100, 500, 1000, etc.) and/or having a high packing density (e.g., a packing density in excess of a threshold; a packing density greater than 20%, 30%, 40%, 50%, 60%, 65%, etc.). However, the depth enhancement network can be used for scenes with any suitable objects.

5. Examples

Figure 3:
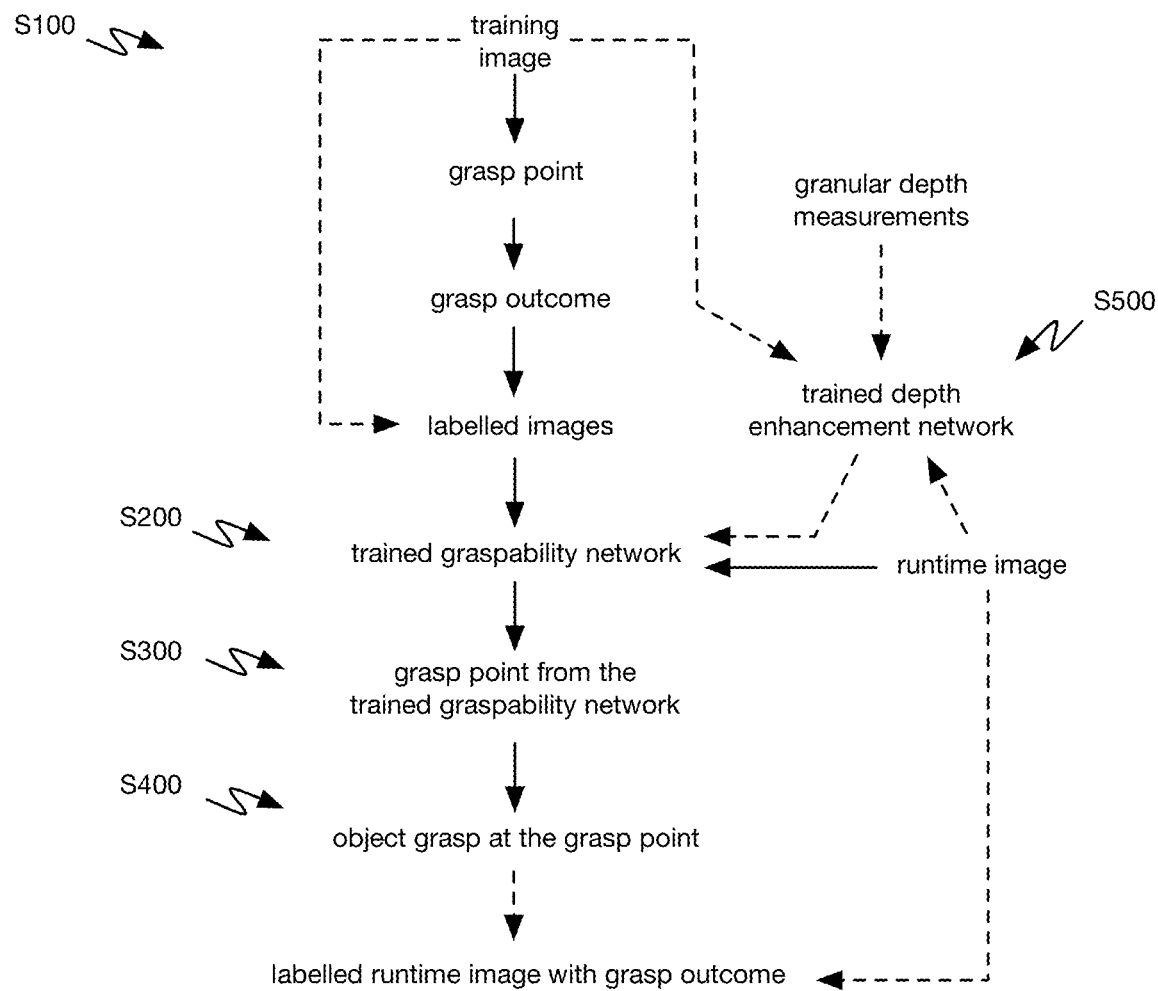
FIG. 3 is a diagrammatic representation of a variant of the method.

In a first variant, the method for increasing the accuracy of grasping an object can include labelling an image based on an attempted object grasp by a robot, wherein the attempted grasp is determined based on an output of an object detector, a robot attempting random grasps, and/or otherwise determined; generating a trained graspability network using the labelled images; determining a grasp point using the trained graspability network; and executing an object grasp at the grasp point (e.g., as depicted in FIG. 3).

In a second variant, a training method can include: selecting a grasp point for a training image using an object detector, labelling the image in association with the grasp point and the grasp result, and training a network based on the image, associated grasp point, and associated grasp result.

In a third variant, a runtime method can include: using a neural network, determining a plurality of candidate grasp points from a runtime image; selecting a target point from the set of candidate grasp points (e.g., using a grasp selector and/or object detector). The target point can be used as an input for a motion planner (e.g., to execute a grasp at the target point).

In an example of the third variant, a runtime method can include: using an object detector for a runtime image (of a plurality of objects of a runtime object scene), determining object parameters for each of the plurality of objects; in parallel, using a graspability network for the same image, generating a probability map (e.g., probability per pixel/scene point depicted by the pixel) identifying candidate grasp points from the probability map; identifying candidate grasp points; selecting a grasp point (e.g., using a grasp selector); determining an object parameter for the selected grasp points from the object detector's result; and calculating instructions for the grasp point based on the object parameter.

In an example of the third variant, a runtime method can include: receiving a runtime image at a graspability network; using the graspability network, generating a probability map (e.g., probability per pixel/scene point depicted by each pixel) and a set of grasp poses (e.g., effector pose; grasp pose per scene point depicted by each pixel or grasp pose map; grasp pose for each of the top-N grasp points; etc.) from the runtime image; identifying candidate grasp points based on probability map; selecting a grasp point from the candidate grasp points (e.g., according to a set of heuristics, using a grasp selector, etc.); and calculating instructions for grasp point based on respective manipulator pose.

In an example of the third variant, a runtime method can include: receiving a runtime image at a graspability network; using the graspability network, generating a probability map (e.g., probability per pixel/scene point depicted by each pixel) and a surface parameter map (e.g., surface normal per scene point depicted by each pixel), identifying candidate grasp points based on the probability map; selecting a grasp point (e.g., according to a set of heuristics, using a grasp selector, etc.); and calculating instructions for the grasp point based on the respective surface parameter.

In an example of the third variant, a runtime method can include: receiving a runtime image at a graspability network; and, using the graspability network, generating a probability map (e.g., probability per pixel/scene point depicted by each pixel); in parallel and using the same image, determining a set of candidate grasp points using an object detector; prioritizing candidate grasp points based on their respective probabilities of success on the probability map; and executing a grasp for the top priority candidate grasp point.

In a fourth variant, the graspability network (e.g., as in aforementioned variants) can receive a depth image and the grasp points can be a 3D grasp point (e.g., having a height/depth dimension).

In a fifth variant, the graspability network (e.g., as in the aforementioned variants) can receive an object pose (e.g., as determined by an object detector) as an input.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method comprising:
    generating training data for training a neural network configured to, after processing an input image, generate a probability map indicating respective likelihoods of successfully grasping a corresponding object at a grasp point by a robotic manipulator, wherein generating the training data comprises:
    for each of a plurality of object scenes:
        receiving an image capturing the object scene of the plurality of object scenes, wherein the object scene comprises a first object and a second object that is at least partially occluded by the first object in the imagee;
        determining object parameters for the first object and the second object within the object scene using an object detector, wherein the object parameters represent information of a corresponding object in the image;
        determining a set of candidate grasp points for the image based on the object parameters, each of the set of candidate grasp points associated with a corresponding object of the first object and the second object;
        selecting, according to one or more criteria, a grasp point from the set of candidate grasp points for grasping a corresponding object;
        receiving grasp outcome data representing a grasp outcome for the grasp point, the grasp outcome data being based on whether the corresponding object was successfully grasped by the robotic manipulator; and
        updating the image including labeling the grasp point in the image with the grasp outcome; and
    training the neural network, using the generated training data that includes the updated images capturing the plurality of object scenes.

2. The method of claim 1, wherein the information for a corresponding object comprises at least one or more of: a keypoint associated with the corresponding object, a bounding box for the corresponding object, a label for the corresponding object, a pose of the corresponding object, an object mask for the corresponding object, or a visibility score for the corresponding object.

3. The method of claim 2, wherein the neural network is a fully convolutional neural network (FCN).

4. The method of claim 1, wherein the one or more criteria comprise:
a proximity associated with a candidate grasp point to an edge of a container for the object scene, a level of occlusion between the first object and the second object, a depth value associated with the candidate grasp point, a keypoint type associated with the grasp point, or a keypoint label associated with the grasp point.

5. The method of claim 1, wherein the first object and the second object are homogeneous.

6. The method of claim 1, further comprising:
receiving an additional image capturing an object scene different from the plurality of object scenes;
processing the additional image using the neural network, to generate a probability map for the additional image, selecting an exploratory grasp point for the additional image based on the probability map and an exploration rule;
determining a grasp outcome for the exploratory grasp point; and
updating the neural network using the additional image, the exploratory grasp point, and the grasp outcome for the exploratory grasp point.

7. The method of claim 1, wherein the object detector is trained using a set of artificially-generated training examples capturing multiple object scenes.

8. The method of claim 1, wherein generating the training data further comprises:
for the image capturing the object scene, determining a grasp pose for the robotic manipulator based on the object parameters, wherein the grasp pose for the robotic manipulator represents a pose for the robotic manipulator to grasp the corresponding object at the grasp point, and
labeling the grasp point in the image with the grasp pose.

9. The method of claim 1, wherein the probability map for the input image comprises a respective probability of grasp success for each of at least a majority of pixels of the input image.

10. The method of claim 1, wherein the neural network comprises a pretrained depth enhancement network, trained based on images depicting different scenes, noisy depth information associated with each different scene, and accurate depth information associated with each different scene; wherein the pretrained depth enhancement network outputs accurate depth information for a test image, wherein the images depicting different scenes are different from the images capturing the plurality of object scenes.

11. The method of claim 1, wherein determining a grasp outcome for the grasp point comprises controlling a robotic manipulator to grasp the corresponding object at the grasp point.

12. The method of claim 11, wherein the training data further comprises a manipulator pose of the robotic manipulator for each grasp point in the updated images; wherein the probability map for the input image further comprises a predicted manipulator pose for a corresponding robotic manipulator grasping at a predicted grasp point associated with an object depicted within the input image.

13. The method of claim 11, wherein the training data further comprises a manipulator pose of the robotic manipulator for each grasp point in the updated images; wherein the probability map for the input image further comprises a predicted manipulator pose a corresponding robotic manipulator grasping at each pixel of input image.

14. A system comprising one or more computers and one or more storage devices storing instructions that when executed by one or more computers cause the one or more computers to perform respective operations, the operations comprising:
generating training data for training a neural network configured to, after processing an input image, generate a probability map indicating respective likelihoods of successfully grasping a corresponding object at a grasp point by a robotic manipulator, wherein generating the training data comprises:
for each of a plurality of object scenes:
receiving an image capturing the object scene of the plurality of object scenes, wherein the object scene comprises a first object and a second object that is at least partially occluded by the first object in the image;
determining object parameters for the first object and the second object within the object scene using an object detector, wherein the object parameters represent information of a corresponding object in the image;
determining a set of candidate grasp points for the image based on the object parameters, each of the set of candidate grasp points associated with a corresponding object of the first object and the second object;
selecting, according to one or more criteria, a grasp point from the set of candidate grasp points for grasping a corresponding object;
receiving grasp outcome data representing a grasp outcome for the grasp point, the grasp outcome data being based on whether the corresponding object was successfully grasped by the robotic manipulator; and
updating the image including labeling the grasp point in the image with the grasp outcome; and
training the neural network, using the generated training data that includes the updated images capturing the plurality of object scenes.

15. The system of claim 14, wherein the information for a corresponding object comprises at least one or more of: a keypoint associated with the corresponding object, a bounding box for the corresponding object, a label for the corresponding object, a pose of the corresponding object, an object mask for the corresponding object, or a visibility score for the corresponding obj ect.

16. The system of claim 14, wherein the operations further comprise:
receiving an additional image capturing an object scene different from the plurality of object scenes;
processing the additional image using the neural network, to generate a probability map for the additional image, selecting an exploratory grasp point for the additional image based on the probability map and an exploration rule;
determining a grasp outcome for the exploratory grasp point; and updating the neural network using the additional image, the exploratory grasp point, and the grasp outcome for the exploratory grasp point.

17. The system of claim 14, wherein generating the training data further comprises:
for the image capturing the object scene, determining a grasp pose for the robotic manipulator based on the object parameters, wherein the grasp pose for the robotic manipulator represents a pose for the robotic manipulator to grasp the corresponding object at the grasp point, and
labeling the grasp point in the image with the grasp pose.

18. One or more non-transitory computer-readable storage media storing instructions that when executed by one or more computers cause the one or more computers to perform respective operations, the respective operations comprising:
generating training data for training a neural network configured to, after processing an input image, generate a probability map indicating respective likelihoods of successfully grasping a corresponding object at a grasp point by a robotic manipulator, wherein generating the training data comprises:
for each of a plurality of object scenes:
receiving an image capturing the object scene of the plurality of object scenes, wherein the object scene comprises a first object and a second object that is at least partially occluded by the first object in the image;
determining object parameters for the first object and the second object within the object scene using an object detector, wherein the object parameters represent information of a corresponding object in the image;
determining a set of candidate grasp points for the image based on the object parameters, each of the set of candidate grasp points associated with a corresponding object of the first object and the second object;
selecting, according to one or more criteria, a grasp point from the set of candidate grasp points for grasping a corresponding object;
receiving grasp outcome data representing a grasp outcome for the grasp point, the grasp outcome data being based on whether the corresponding object was successfully grasped by the robotic manipulator; and
updating the image including labeling the grasp point in the image with the grasp outcome; and
training the neural network, using the generated training data that includes the updated images capturing the plurality of object scenes.

19. The one or more non-transitory computer-readable storage media of claim 18, wherein the information for a corresponding object comprises at least one or more of: a keypoint associated with the corresponding object, a bounding box for the corresponding object, a label for the corresponding object, a pose of the corresponding object, an object mask for the corresponding object, or a visibility score for the corresponding object.

20. The one or more non-transitory computer-readable storage media of claim 18, wherein the operations further comprise:
receiving an additional image capturing an object scene different from the plurality of object scenes;
processing the additional image using the neural network, to generate a probability map for the additional image,
selecting an exploratory grasp point for the additional image based on the probability map and an exploration rule;
determining a grasp outcome for the exploratory grasp point; and
updating the neural network using the additional image, the exploratory grasp point, and the grasp outcome for the exploratory grasp point.

21. The one or more non-transitory computer-readable storage media of claim 18, wherein generating the training data further comprises:
for the image capturing the object scene, determining a grasp pose for the robotic manipulator based on the object parameters, wherein the grasp pose for the robotic manipulator represents a pose for the robotic manipulator to grasp the corresponding object at the grasp point, and
labeling the grasp point in the image with the grasp pose.

* * * * *